(12) United States Patent
Retti

(10) Patent No.: US 9,882,249 B2
(45) Date of Patent: Jan. 30, 2018

(54) AUTONOMOUS, MODULAR POWER GENERATION, STORAGE AND DISTRIBUTION APPARATUS, SYSTEM AND METHOD THEREOF

(75) Inventor: Kahrl L. Retti, Parkville, MD (US)

(73) Assignee: Solaroad Technologies Group, LLC, Baltimore, MD (US)

( * ) Notice: Subject to any disclaimer, the term of this patent is extended or adjusted under 35 U.S.C. 154(b) by 589 days.

(21) Appl. No.: 12/292,817

(22) Filed: Nov. 26, 2008

(65) Prior Publication Data

US 2009/0133733 A1 May 28, 2009

Related U.S. Application Data

(60) Provisional application No. 60/996,604, filed on Nov. 27, 2007, provisional application No. 61/054,806, filed on May 20, 2008.

(51) Int. Cl.
| | |
|---|---|
| *H01M 10/46* | (2006.01) |
| *H02J 7/35* | (2006.01) |
| *H02S 40/38* | (2014.01) |
| *H02S 10/10* | (2014.01) |
| *H01M 10/0525* | (2010.01) |

(52) U.S. Cl.
CPC ........ *H01M 10/465* (2013.01); *H02J 7/355* (2013.01); *H02S 10/10* (2014.12); *H02S 40/38* (2014.12); *H01M 10/0525* (2013.01); *Y02E 60/122* (2013.01); *Y02T 10/7011* (2013.01)

(58) Field of Classification Search
CPC ...................................... H01L 31/045
USPC ........................................ 136/206
See application file for complete search history.

(56) References Cited

U.S. PATENT DOCUMENTS

| | | | | |
|---|---|---|---|---|
| 4,528,417 | A | * | 7/1985 | Chubb ............................ 136/253 |
| 4,561,614 | A | * | 12/1985 | Olikara et al. .............. 244/172.6 |
| 4,636,579 | A | * | 1/1987 | Hanak et al. ................. 136/245 |
| 6,201,180 | B1 | * | 3/2001 | Meyer .................... F24J 2/5205 |
| | | | | 126/623 |
| 2006/0090789 | A1 | * | 5/2006 | Thompson .................... 136/246 |
| 2007/0215197 | A1 | * | 9/2007 | Buller et al. .................. 136/243 |
| 2007/0289622 | A1 | * | 12/2007 | Hecht ............................. 136/246 |

* cited by examiner

*Primary Examiner* — Shannon Gardner
(74) *Attorney, Agent, or Firm* — Whiteford, Taylor & Preston, LLP; Gregory M. Stone

(57) ABSTRACT

An autonomous, modular energy generation, storage and transmission apparatus, system, and method is provided. An apparatus is tube shaped and includes solar and thermionic energy conversion layers, and a battery module. A system of modular apparatuses may be connected together to form an transmission network. Such devices are particularly suited for outdoor application on highway jersey walls, and for indoor application on office cubicle walls. A method of charging battery modules in the apparatus is provided, along with a method of distributing the same in commerce.

6 Claims, 31 Drawing Sheets

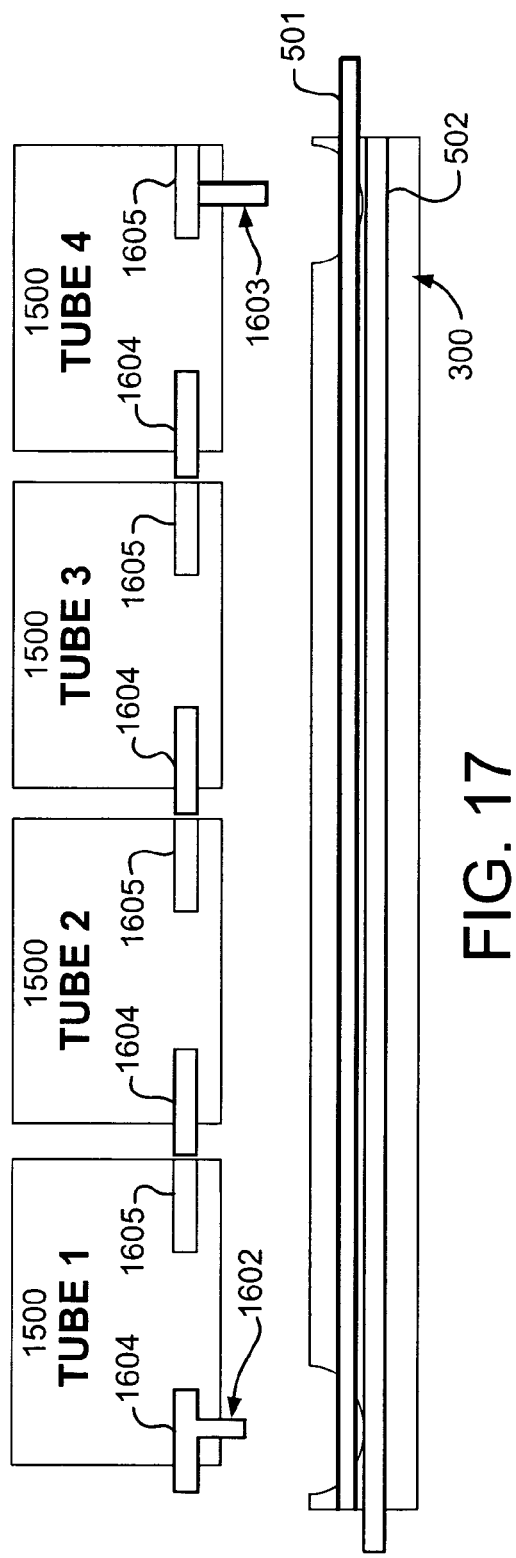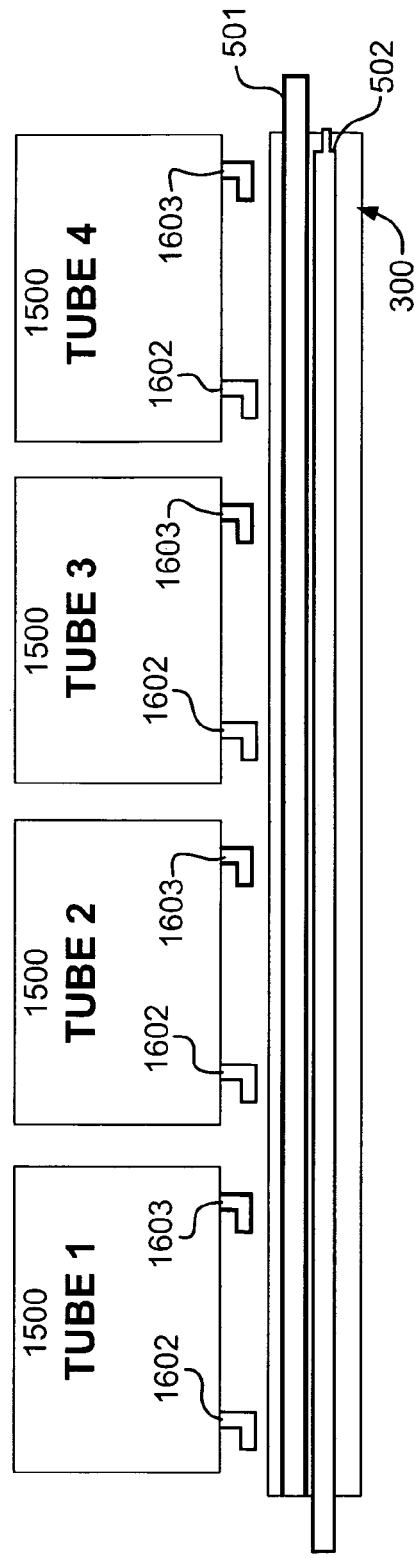

AUTONOMOUS, MODULAR POWER GENERATION, STORAGE AND DISTRIBUTION APPARATUS, SYSTEM AND METHOD THEREOF

CROSS-REFERENCE TO RELATED APPLICATION

This application claims the benefit under 35 U.S.C. § 119(e) of Provisional Patent Application No. 60/996,604, filed Nov. 27, 2007, and Provisional Patent Application No. 61/054,806, filed May 20, 2008, the entire disclosures of which are hereby incorporated by reference.

FIELD OF THE INVENTION

The present invention relates to an apparatus, system and method for generating electricity from photonic and thermal energy as well as storing and distributing generated electricity. More particularly, the present invention relates to a tube shaped, autonomous modular apparatus that is adapted to be attached to various structures, such as highway jersey walls or indoor office cubicles. The apparatus is capable of generating electricity from photonic and thermal energy, and due to the curved shaped, can receive energy from light sources at any angle, without resorting to motorized photovoltaic panels to follow the source of light.

DESCRIPTION OF THE RELATED ART

Many devices have been introduced for collection of solar energy and the storage and/or distribution thereof. Most of these devices consist of photovoltaic solar panels mounted on a roof or on large land mounted frames that are tied to electrical distribution systems, or to large banks of batteries that store the generated power. These systems are usually quite large and bulky, and they are very expensive to construct.

Conventional photovoltaic (PV) cells are between 15% and 20% efficient at conversion of solar energy to electrical energy. As a result, it takes many years to break even on the investment made on systems using these conventional PV cells. In addition, because the cost of these systems is out of reach for most homeowners, the use of these photovoltaic systems is mainly confined to large land based systems operated by utility companies. These systems generally consist of large mega panels mounted on a motorized system to follow the arc of the sun as it moves across the sky.

A common problem with flat panels is maintaining the proper angle of incidence. Once the proper angle is lost, photovoltaic conversion becomes inefficient. Another problem suffered by these systems is the lack of production when the weather is inclement. These solar arrays are not portable. Therefore, when it is raining or cloudy, these panels produce little or no electricity. Likewise, a homeowner, who has converted his home to solar-power, cannot power his home during times of little or no sunshine, or must resort to using power from the common electrical power grid.

Another problem with conventional solar power systems is the lack of efficiency due to losses suffered in the distribution system. When electricity is generated by a solar array and distributed over a long distance to an end user, significant resistive losses are suffered. Similar losses are suffered when electricity is generated at a solar panel, and distributed to a remote storage device.

In addition, conventional solar power systems are limited to outdoor applications. Few attempts, if any, have been made to harvest the photonic and thermal energy emitted from interior lighting in the millions of homes and offices around the country.

The United States has approximately 47,000 miles of interstate highways, and many thousands more of state and local highways and roads. All of these are heated by the sun's rays each day, and yet this bounty of energy is essentially wasted.

Therefore, what is needed is an improved system and method to harvest alternative sources of energy including photonic and thermal energy. Such and improved system and method will overcome the disadvantages described above, and provide additional advantages, as will become clear from the following description.

SUMMARY OF THE INVENTION

Accordingly, it is an object of the present invention to provide solutions to the above and other problems associated with generating, storing and distributing energy from alternative sources.

According to one aspect of the present invention, a hollow tube-shaped autonomous modular solar energy collection apparatus is provided that preferably comprises a photovoltaic ("PV") module, a thermionic module, a battery module, a monitoring and control module and a load interfacing module. According to one embodiment, which is suitable for being deployed outdoors on highway jersey walls, the apparatus includes, from outer layer to inner layer, a clear outer shell made of UV stable polycarbonate plastic, a photovoltaic layer made of curved thin-film, amorphous silicon photovoltaic cells, and a thermionic layer forming a hollow tube. The apparatus also preferably includes a battery module, which according to the particular application, may be a thin-film lithium ion battery layer forming part of the hollow tube, or a battery pack filling the interior of the tube. The tube portion is mounted to a base to facilitate integration of the apparatus into an electrical distribution system. The apparatus also preferably include sensors and a microprocessor-based control system to advantageously monitor and control various aspects of the operation of the apparatus components.

According to another aspect of the invention, the battery module of the device may be implemented in the form of a removable battery core, which can also be used to power other devices in a variety of applications. In addition, multiple battery cores may be stacked or concatenated together to increase the total capacity of the supplied electrical energy.

According to still another aspect of the invention, the battery module of the apparatus includes a battery management module (BMM), which intelligently controls the charging and discharging of multiple battery banks so as to increase the efficiency and safety of the batteries of the battery module.

According to still another aspect of the invention, the load interfacing module of the apparatus is structured to facilitate the safe installation of the apparatus along highways, roadways, or other suitable infrastructure, and the integration of the apparatus into the electrical distribution system extended to those infrastructures.

According to yet another aspect of the present invention, each autonomous apparatus is outfitted with sensors, a microprocessor and a communication module to enable remote monitoring of the health and operation status of the apparatus.

According to still another aspect of the present invention, a battery pack enclosure is provided. The battery pack enclosure includes a battery core, a thermal resisting layer wrapped around the battery core, and a thermal insulation layer wrapped around the thermal resisting layer. The thermal resisting layer is preferably formed from a ceramic material, and the thermal insulating layer is preferably formed of fiberglass.

According to yet another aspect of the present invention, a plurality of autonomous devices as described above are arranged together to form a hybrid power system. The system provides DC and AC power. AC power can be provided to a building's main service panel, or via a standard AC outlet provided as part of the system. The battery modules of individual devices in the system can be charged from the PV and thermionic layers, or from the building's main service panel AC distribution system, as the need arises.

According to still another aspect of the present invention, a system as described above advantageously provides a "green switch" which provides DC power to DC devices, thereby avoiding inefficient losses caused by unnecessary conversions between AC and DC power. The green switch preferably automatically detects the power requirements of an attached load device, and provides power in AC or DC form, as appropriate.

According to yet another aspect of the present invention, a battery module is adapted for use in a host device. The battery module includes an attachment device to connect power to the host device only after the battery module is fully engaged with the host device. In one such embodiment, the attachment device comprises a spring loaded plunger that is depressed as the battery module is properly inserted into the host device, and the depression causes power to be connected from the battery module to the host device.

According to still another aspect of the present invention, the battery module communicates status information to the host device. The host device, in turn, calculates a range based on the status information received from the battery module in combination with parameters of the host device. In a preferred embodiment, the host device is an electric vehicle, the status information of the battery module includes the charge level of the battery module, and the parameters of the host device include the vehicle's weight, engine parameters, and the like. The range is calculated based on the charge level of the battery module, the weight of the vehicle, and other available parameters, and the range is displayed on a display in the electric vehicle.

According to yet another aspect of the present invention, a method of providing charged battery modules is provided. Customers obtain charged battery modules and return discharged battery modules. Discharged battery modules are recharged and made available to customers as charged battery modules. A vending machine is preferably used to make charged battery modules available, to accept discharged battery modules, and to charge discharged battery modules.

According to still another aspect of the present invention, a system of devices form an infrastructure and conduit for additional services. The additional services can include traffic cameras, speed detecting devices, vehicle disabling devices, and internet communication services.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which:

FIGS. 17-18 illustrate alternative electrical connections of devices according to exemplary embodiments of the present invention;

Throughout the drawings, like reference numbers will be understood to refer to like elements, features, and structures.

DETAILED DESCRIPTION OF EXEMPLARY EMBODIMENTS

The matters set forth in the following description, such as a detailed construction and elements, are provided to assist in a comprehensive understanding of embodiments of the invention and are intended to be merely exemplary. Accordingly, a skilled artisan will recognize that various changes and modifications of the embodiments described herein can be made without departing from the scope and spirit of the invention. Also, descriptions of well-known functions and constructions are omitted for clarity and conciseness.

Exemplary embodiments of present invention will now be described in greater detail with reference to the accompanying drawings.

Figure 1:
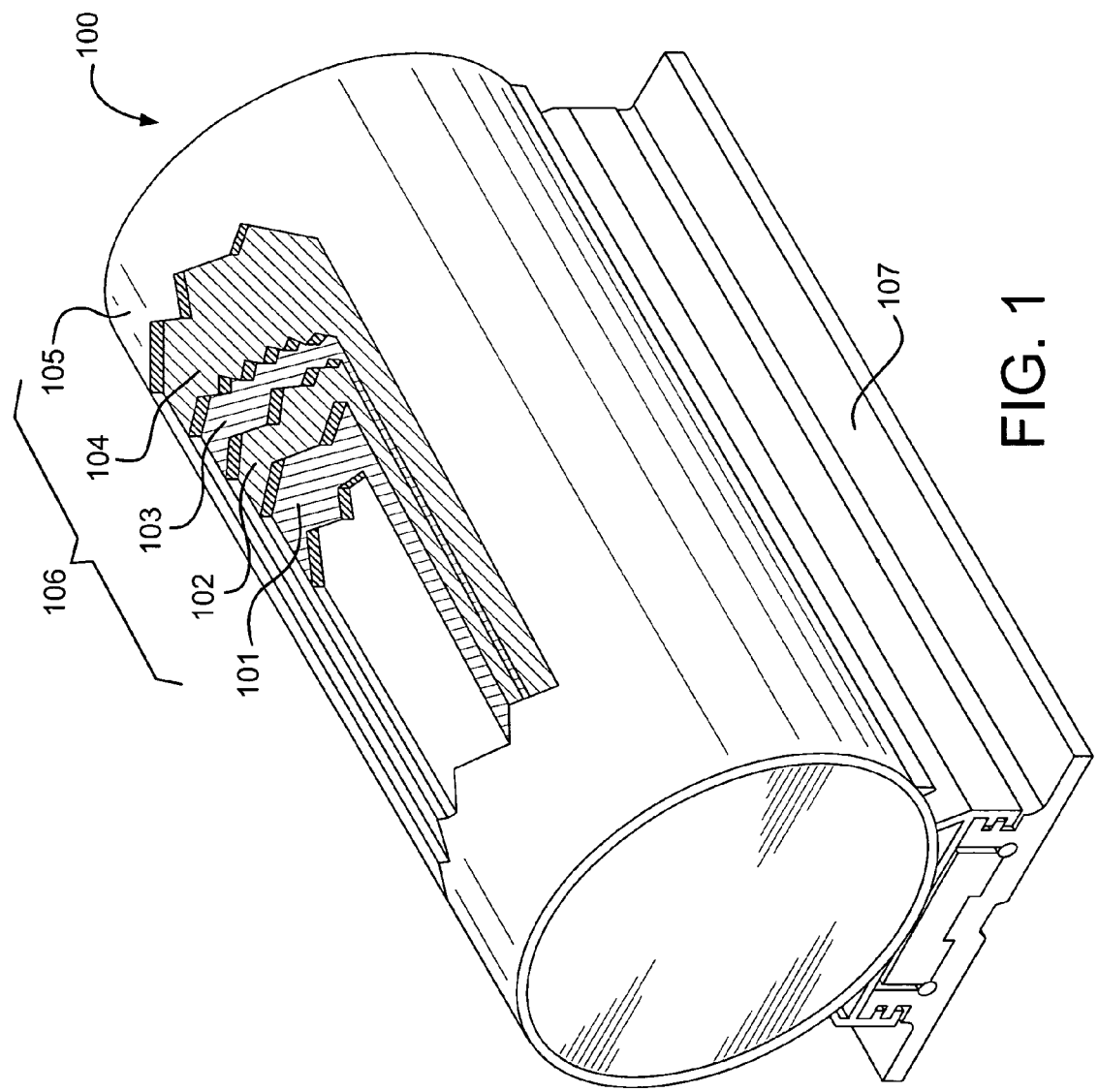
FIG. 1 is a cutaway view of a device according to an exemplary embodiment of the present invention.

FIG. 1 is a cutaway view of a device 100 according to a first exemplary embodiment of the invention. The device 100 is cylindrical in shape, and comprises, from inner layer to outer layer, a hollow tube-shaped substrate 101 on which the upper layers are formed. The battery layer 102 is formed on the substrate layer 101. The battery layer 102 is preferably formed of flexible, thin-film rechargeable lithium ion batteries. Outside the battery layer 102, the thermionic layer 103 is formed. The thermionic layer converts thermal energy into electrical energy, and will be described in further detail below. Outside the thermionic layer 103, a curved, flexible photovoltaic ("PV") layer 104 is formed. The PV layer 104 converts photonic energy into electrical energy. Finally, a clear outer shell 105 made of UV protective material, such as stable polycarbonate plastic, encases the tube portion 106 of the device. The tube portion 106 is mounted to a base 107.

As user herein, "layers" may also be described in functional terms as "modules."

It will be appreciated that various modifications can be made to the embodiment describe above for particular applications. For example, the battery layer 102 may be replaced by a battery pack that is inserted into the hollow of the tube portion 106. Also, the battery layer 102 may be located below the PV layer 104, but above the thermionic layer 103. In addition, for indoor applications, the outer shell 105 need not be UV protective.

Figure 2:
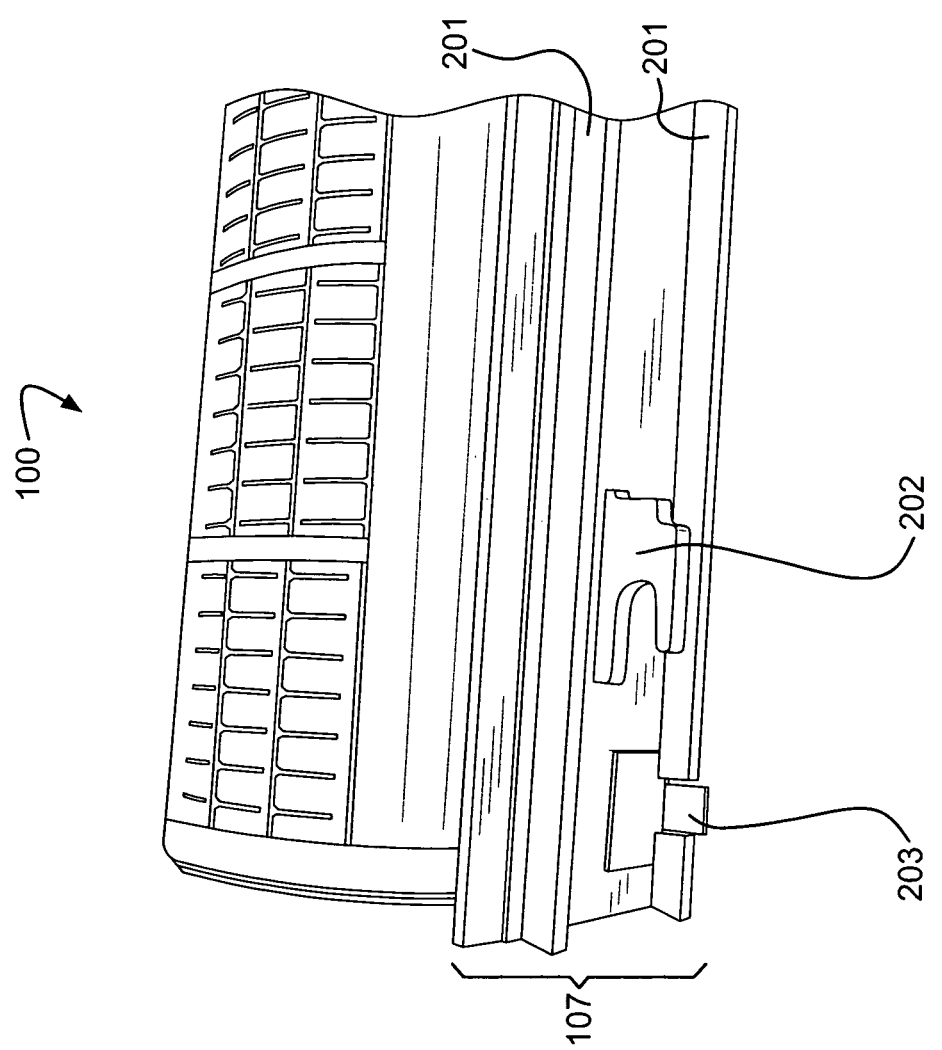
FIG. 2 illustrates the bottom of a load interfacing module of an exemplary embodiment of the present invention.

FIG. 2 illustrates the device 100 of FIG. 1, but from an angle showing the bottom of base 107. Base 107 is preferably formed with guide rails 201 and locking feet 202, which are adapted to mount device 100 to a mounting clip (not shown) which is in turn permanently installed onto infrastructure such as a highway jersey wall. As shown in FIG. 2, base 107 further provides for one or more conductors 203 to protrude downwardly toward the mounting clip, preferably along guide rail 201. As will be appreciated by those of ordinary skill in the art, the number and configuration of the downwardly protruding conductors 203 will vary according to the particular application of the device 100. For example, if a series of devices 100 are to be connected in parallel, then each guide rail 201 preferably will have two downwardly protruding conductors 203, one corresponding to the positive node and one corresponding to the negative node of the parallel circuit. In a serial combination of devices 100, a first device 100 may have one downwardly protruding conductor 203 corresponding to a first node of the serial circuit. A plurality of additional devices 100 can be serially connected to one another via other means, with a last device 100 having another downwardly protruding conductor 203 corresponding to the second node of the serial circuit.

Figure 3:
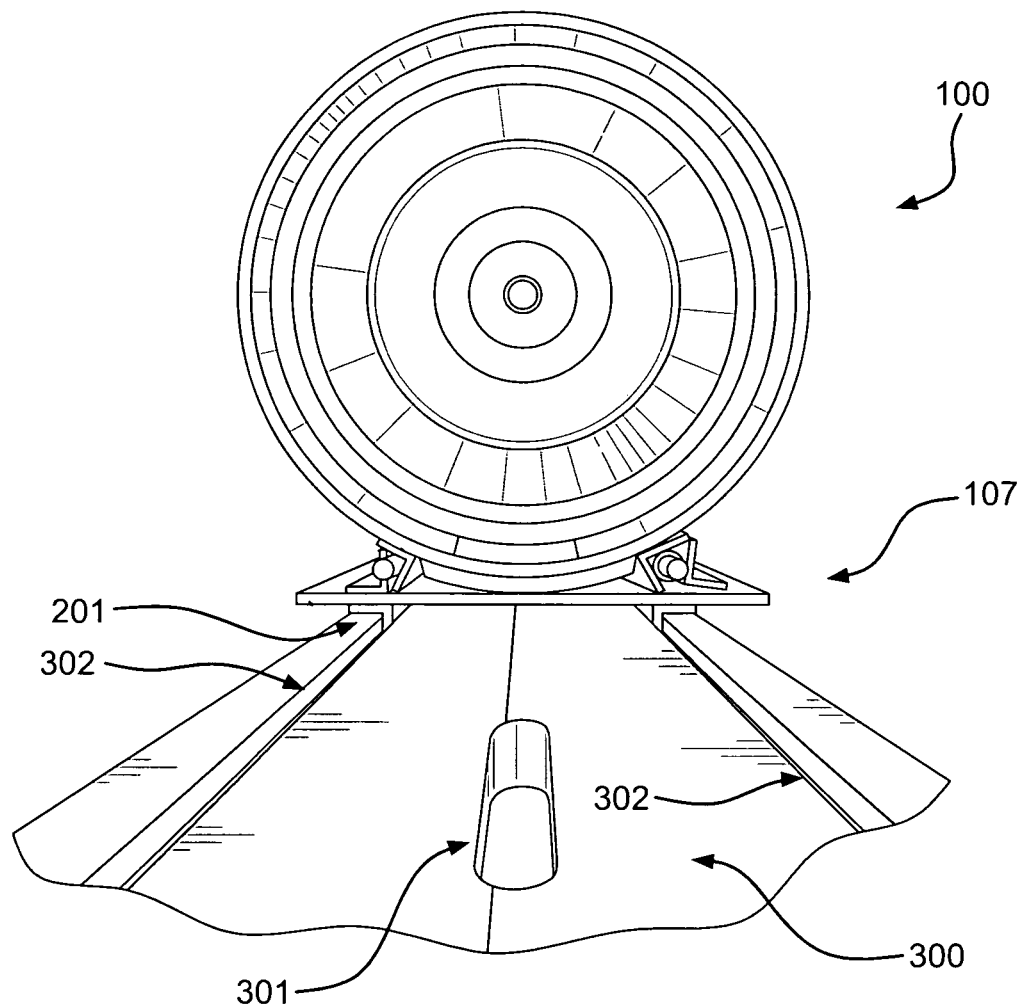
FIG. 3 illustrates an end view of an exemplary embodiment of the present invention.
Figure 4:
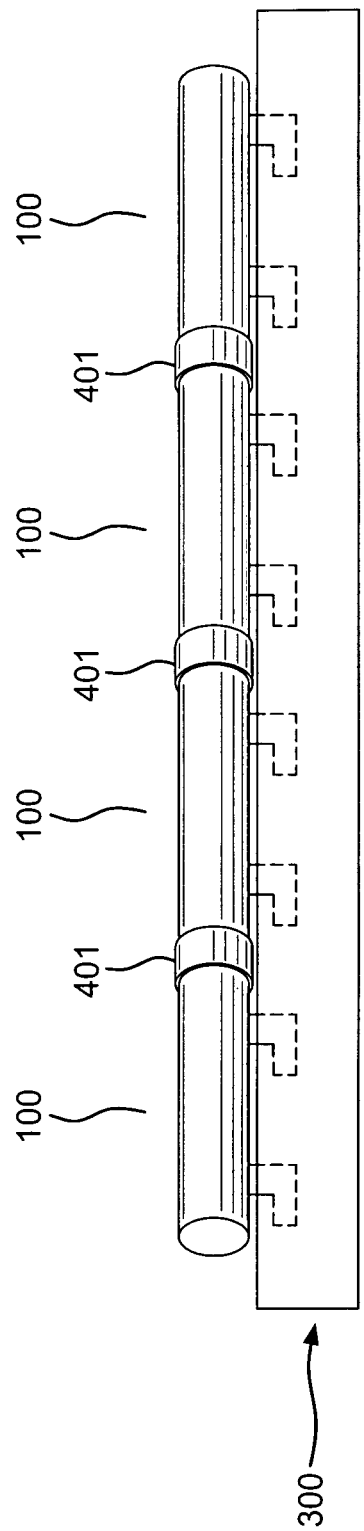
FIG. 4 illustrates a side of a system according to an exemplary embodiment of the present invention.

FIG. 3 illustrates a device 100 being mounted onto a mounting clip 300 according to an exemplary embodiment of the present invention. Mounting clip 300 includes at least one foot receiving hole 301 that receives the foot 202 of base 107. Slots 302 receive guide rails 201 and downwardly protruding conductor 203. In order to mount the device 100 onto the mounting clip 300, the device 100 is first pressed downwardly such that rails 201 are received into slots 302, and foot 202 is received by foot receiving hole 301. Next the device 100 is moved laterally such that foot 202 engages with foot receiving hole 301 to lock the device 100 onto the mounting clip 300. In one preferred arrangement illustrated in FIG. 4, a series of devices 100 are installed adjacent to one another. Spacers 401 are installed between the devices 100 to prevent each device from moving to the release position. Preferably, the spacer is installed using security bolts such that only authorized persons can remove a spacer, in order to release a particular device 100 from the mounting clip 300, for maintenance or to be replaced.

Figure 5:
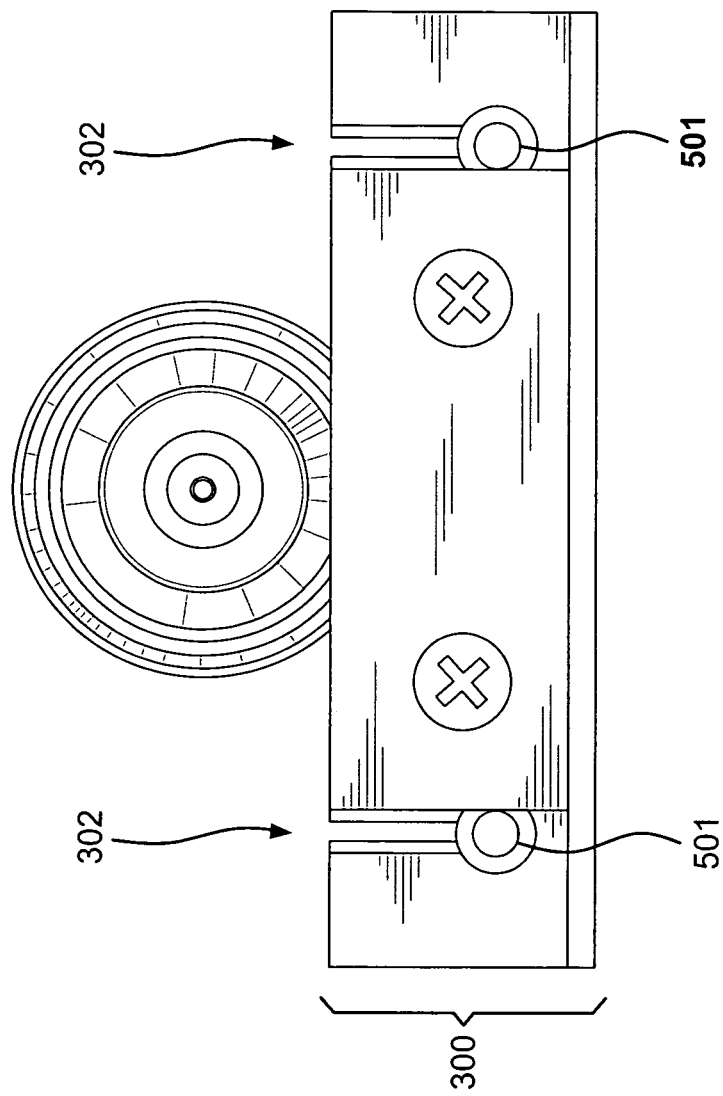
FIG. 5 illustrates an end view of a mounting clip for use with an exemplary embodiment of the present invention.

As illustrated in FIG. 5, distribution conductors 501 are embedded within mounting clip 300. Downwardly protruding conductors 203 of device 100 contact a distribution conductor 501 when the device 100 is installed on the mounting clip 300. Advantageously, distribution conductors 501 are inaccessible to human contact. Furthermore, as will be described in greater detail below, device 100 is preferably manufactured such that when installed onto mounting clip 300, if device 100 is struck by a vehicle, the tube portion 106 is designed to break away from the base 107, such that rails 201 remain inserted into slots 302, and base 107 remains attached to mounting clip 300. As a result, distribution conductors 501 advantageously remain embedded in mounting clip 300 and inaccessible to human contact, even in the event of a vehicular accident.

Figure 6:
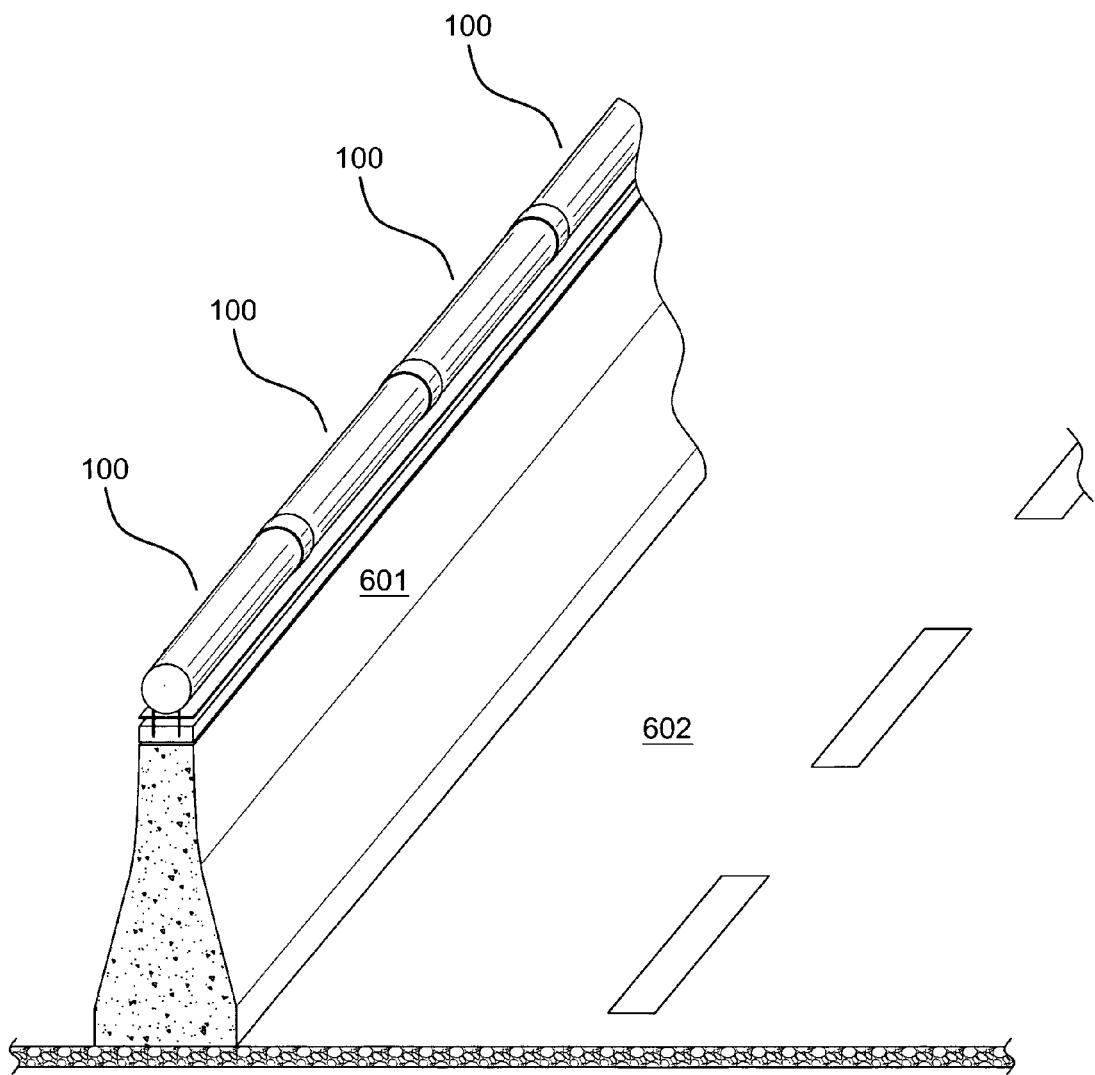
FIG. 6 illustrates an outdoor application of a system according to an exemplary embodiment of the present invention.

FIG. 6 illustrates a series of devices 100 installed onto a jersey wall 601 of a highway 602 in accordance with an outdoor application of an embodiment of the present invention.

An indoor application of the above described concepts share many of the same features. However, certain design choices are preferably changed, as would be appreciated by one of ordinary skill in the art. For example, in an indoor environment, the clear protective outer shell need not be protective of UV rays. In addition, the base 107 and mounting clip arrangement can be simplified since the risk of being struck by a vehicle is eliminated, and the distribution conductors are likely carrying significantly lower rated voltage and current than the outdoor application described above. Accordingly, the distribution conductors may be incorporated into base 107, and base 107 can also form a mounting structure to attach the device 100 to an indoor structure such as an office cubicle wall. The distribution conductors also need not protrude downwardly from base 107. Rather, it is advantageous for the distribution conductors to protrude from the lateral ends of the tube portion 106 such that the devices 100 can easily be chained together.

Figure 7:
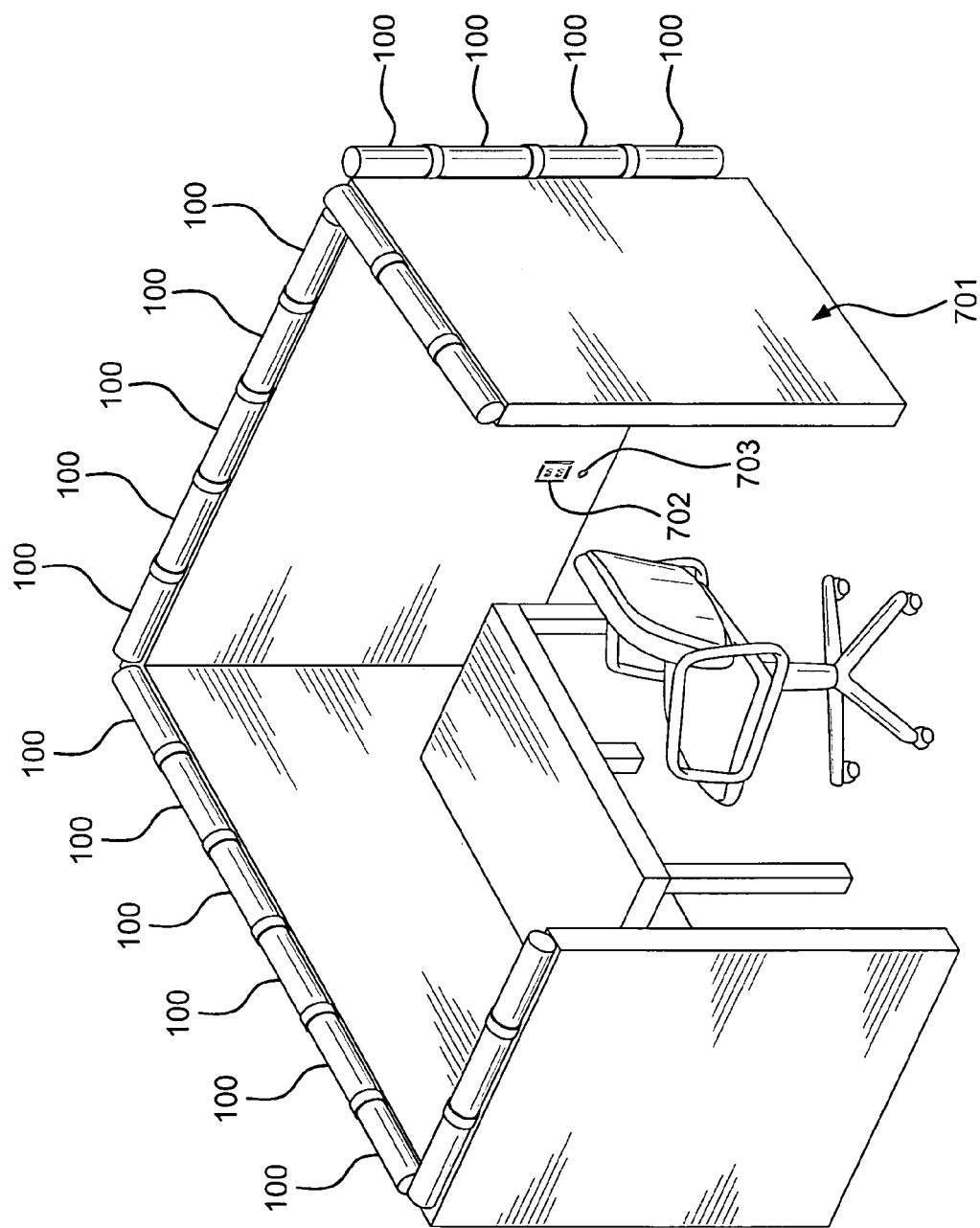
FIG. 7 illustrates an indoor application of an exemplary embodiment of the present invention.

FIG. 7 illustrates an indoor system according to an exemplary embodiment of the present invention. A plurality of devices 100 are installed onto the walls of an office cubicle 701. The devices are connected together. The system also provides a standard AC outlet 702, and a DC outlet 703.

Figure 8:
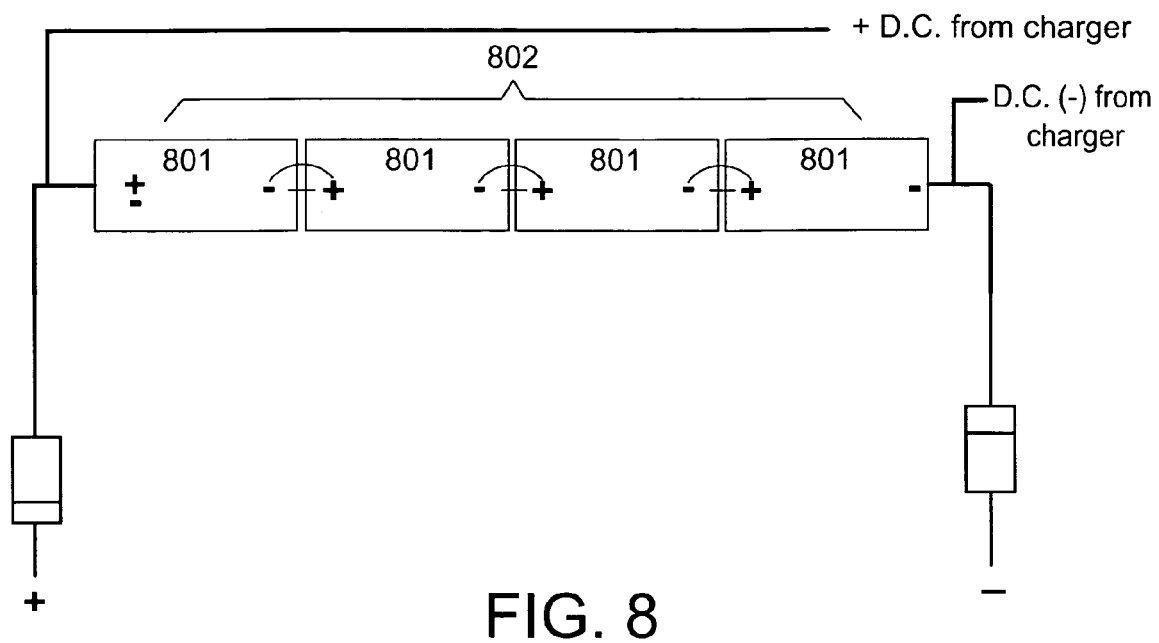
FIGS. 8-15 illustrate the assembly of a battery pack according to an exemplary embodiment of the present invention.
Figure 9:
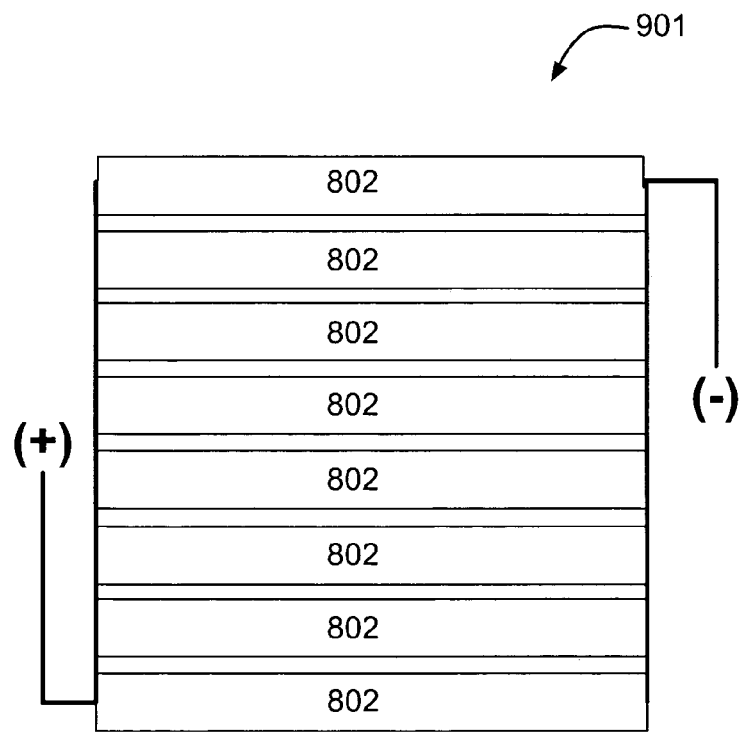

The construction of an exemplary device 100 in accordance with an indoor embodiment will now be described in connection with FIGS. 8-22. FIG. 8 illustrates four individual lithium ion rechargeable batteries 801 that are connected in series to form a cell string 802. Each lithium ion rechargeable battery 801 preferably provides approximately 3.7 volts, and 2600 mA. The cell string 802 provides approximately 15.34 volts and 2600 mA. Next, eight cell strings 802 are connected together in parallel, to form a battery pack 901, as shown in FIG. 9. The battery pack provides approximately 15.34 volts and 20.8 amps. Alternately, in an outdoor application with a larger device 100, twenty-four cell strings 802, each having four battery cells 801, are connected in parallel to produce a battery pack 901 that has a total voltage of 15.34 volts at 85 amps.

Figure 10:
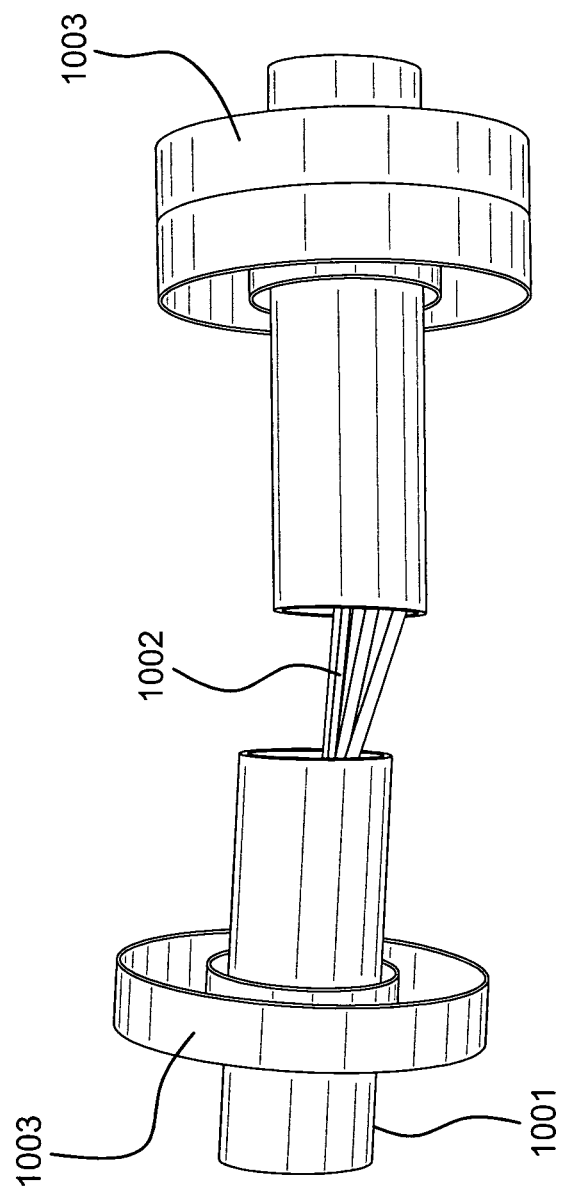
Figure 11:
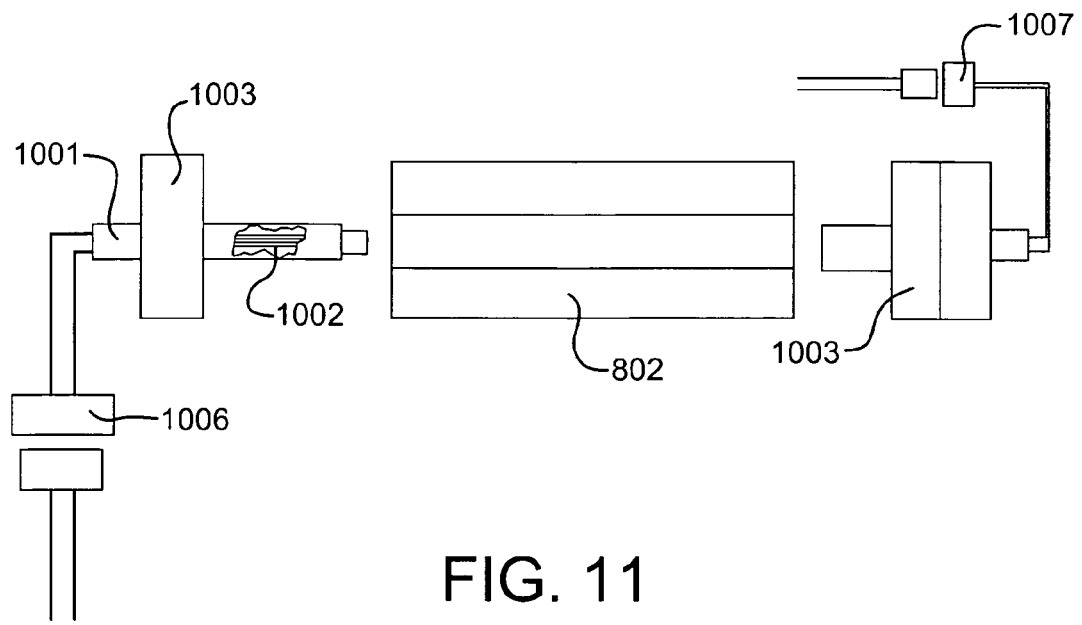
Figure 12:
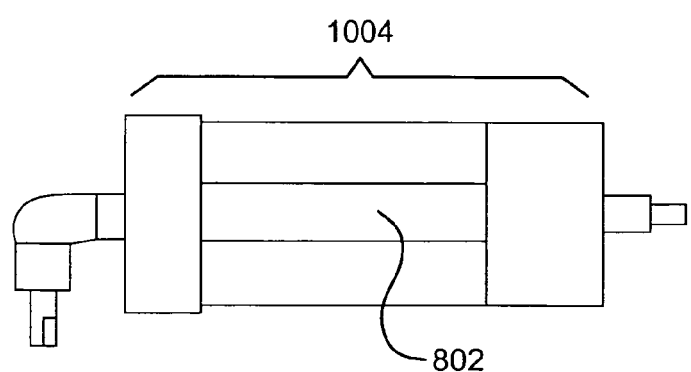

Assembly of the battery pack is described in further detail in connection with FIGS. 10-12. As shown in FIGS. 10-12, a hollow conduit 1001 is provided to form a passageway for conductors 1002. The hollow conduit 1001 holds battery retainer caps 1003, through which the conductors 1002 are fed to form electrode contacts for the cell strings 802. Eight cell strings 802 are arranged around the hollow conduit 1001, attached to the conductors 1002, and retained by battery retainer caps 1003, to form battery pack assembly 1004. The battery pack assembly 1004 is fitted with plugs 1006 and 1007 attached at either end of the battery pack assembly 1004 for connection to the power out circuit (not shown) and the charging circuit (not shown).

Figure 13:
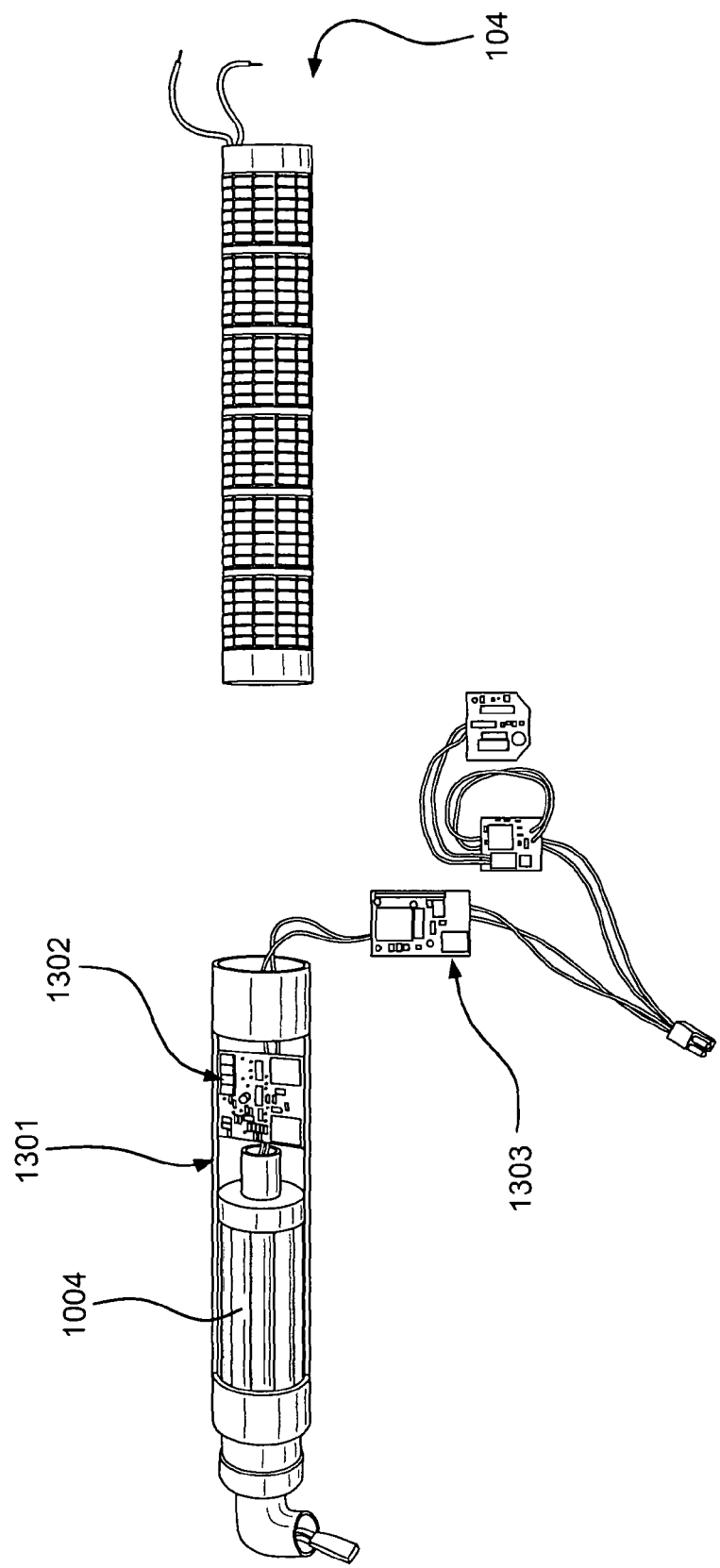

Referring to FIG. 13, the assembled battery pack 1004 is inserted into a ceramic housing 1301, which is shown in cutaway view. The ceramic housing is preferably wrapped in a thermal insulation layer, such as fiberglass (not shown). The battery pack assembly 1004 is connected to the charging circuit 1302 via plug 1007. The charging circuit 1302 is preferably connected to two sources of energy. First, the charging circuit 1302 is connected to standard 120VAC power for charging the battery pack when ambient light is not sufficient. Second, the charging circuit 1302 is connected to the PV and thermionic modules, as described above. These are the primary means of charging the battery pack.

Once the battery pack assembly 1004 and the charging circuit 1302 have been installed in the ceramic conduit 1301, an AC/DC charging and control switch gear 1303 is installed. The AC/DC charging and control switch gear controls the incoming AC or DC charge cycles. The AC/DC charging and control switch gear is preferably held in place within the ceramic conduit 1301 by preformed lips with attachment points corresponding to attachment points on the AC/DC charging and control switch gear circuit board 1303. Of course, this description is merely exemplary, and those of ordinary skill in the art will recognize a wide variety of well known means for installing a circuit board in a conduit. The AC/DC charging and control switch gear 1303 can include a standard AC wall plug for connection to a standard 120VAC wall outlet.

Figure 14:
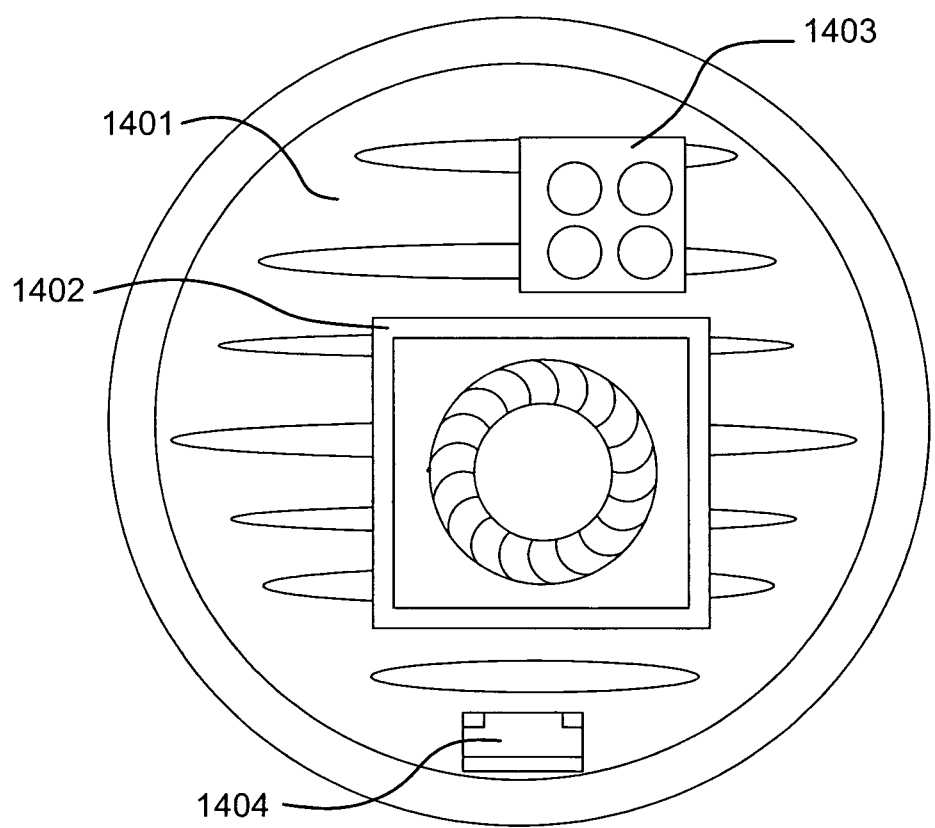

The battery package is completed by the addition of ceramic end caps (not shown). One end cap preferably has a center opening for connector plug 1006. FIG. 14 illustrates the other end cap 1401, which preferably has louvered openings to facilitate air movement by a fan 1402. An LED charge status array 1403 preferably includes four LEDs to indicate various conditions. A standard USB port 1404 is also preferably provided.

Figure 15:
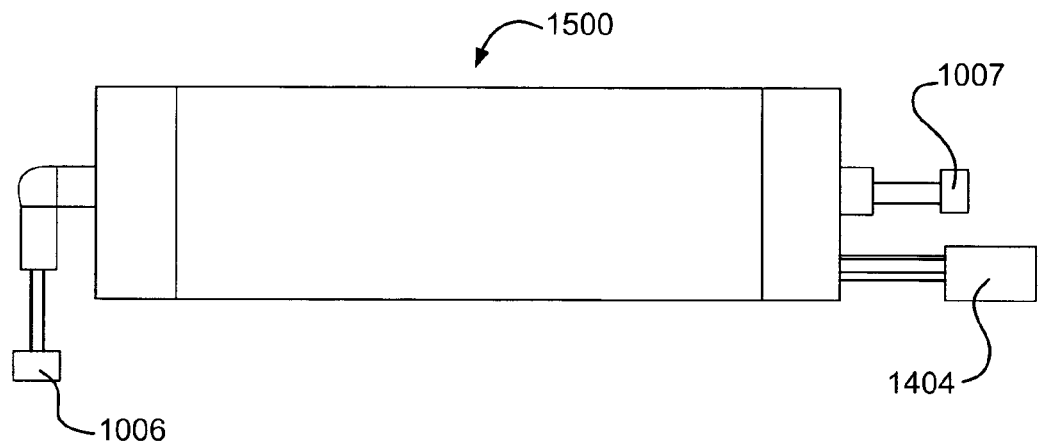
Figure 16:
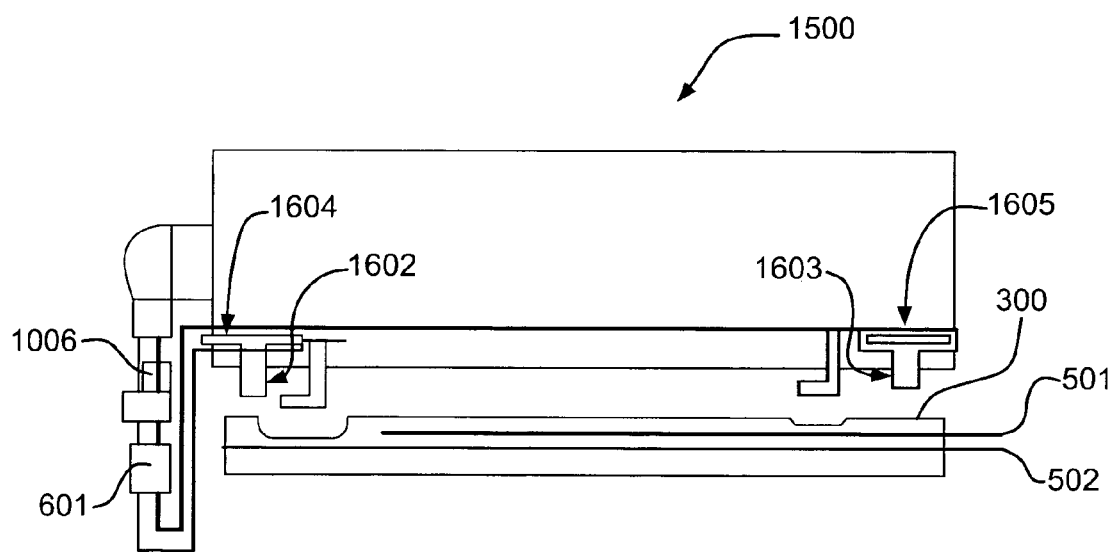
FIG. 16 illustrates an exemplary embodiment of the present invention.

The assembled battery pack 1500 is shown in FIG. 15. The particular application for which the battery pack 1500 is to be used determines the configuration of the external connections. FIG. 16 illustrates a first example, in which the assembled battery pack 1500 is used in an external application, as in the jersey wall application described above. Plug 1006 is connected to a solenoid 1601 of a battery output control circuit board (not shown). When the battery has full charge, the solenoid 1601 closes and connects the battery to the distribution conductors 501, 502. As discussed above, various combinations of downwardly projecting conductors 1602, 1603, or laterally projecting conductors 1604, 1605 may be used to connect devices together in parallel or serial connection. A series of devices 1500 connected in serial fashion are shown in FIG. 17. A series of devices 1500 connected in parallel fashion are shown in FIG. 18.

Figure 19:
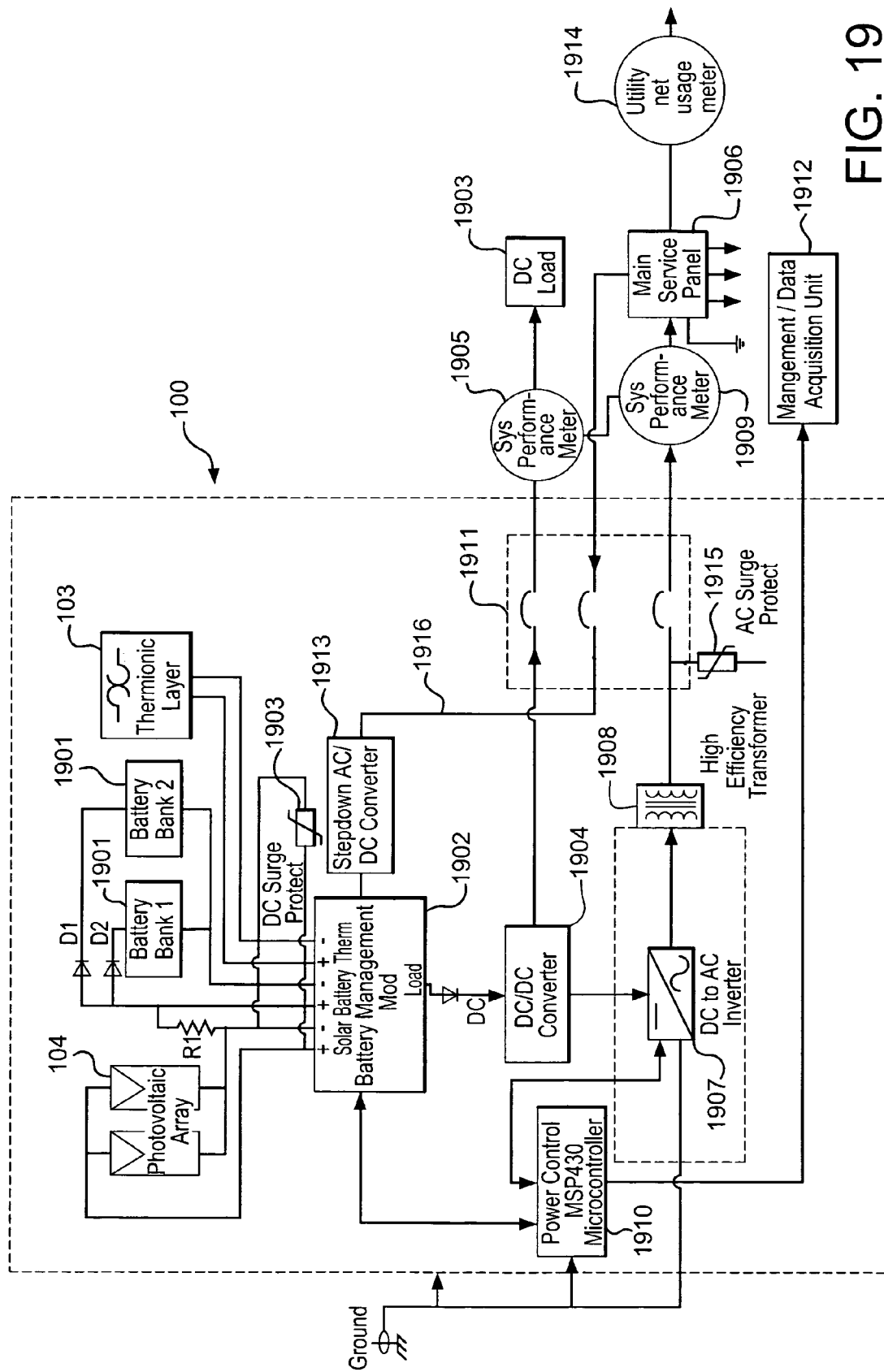
FIG. 19 is a functional block diagram of a system according to an exemplary embodiment of the present invention.

A functional block diagram of an exemplary embodiment of the present invention is illustrated at FIG. 19. As described above, the device 100 comprises a PV layer 104, a thermionic layer 103, and one or more battery banks 1901. The PV layer 104, thermionic layer 103, and the battery banks 1901 are connected to a battery management module 1902. A DC surge protector 1903 is preferably provided to protect the internal circuits of the device 100. The battery management module provides DC power to a DC load 1903 via DC-to-DC converter 1904. Optionally, a system performance meter 1905 tabulates usage of the DC power supply. The battery management module further provides AC power to a load such as a building's main service panel 1906 via the DC-to-AC inverter 1907, and high efficiency transformer 1908. Optionally, another system performance meter 1909 tabulates usage of the AC power supply. Preferably, an AC surge protection device 1915 is provided to protect the device from power surges. A line isolation breaker 1911 is provided to isolate device 100 from the DC load 1903, and the main service panel 1906.

A microcontroller 1910 is provided to control the functionality of the battery management module 1902, as will be described in further detail below. The microcontroller also communicates with a remote management and data acquisition unit 1912. Accordingly, the device 100 can be monitored remotely. Preferably, the microcontroller communicates with the remote management and data acquisition unit 1912 via a cellular communication protocol such as GSM or CDMA. However, any suitable communication protocol, including TCP/IP, USB, RS232, may be utilized without limitation.

Preferably, the main service panel 1906 supplies AC power to a stepdown AC-to-DC converter 1913 via line 1916, which in turn supplies DC power to the battery management module 1902. This is advantageous in situations in which the energy generating modules 104, 103 are not generating enough energy. The battery management module 1902 can intelligently charge the battery banks 1901 using the power supplied from the main service panel 1906. Finally, a utility net usage meter 1914 is provided to tabulate net power usage for the entire building's main service panel 1906. Battery management module 1902 further can advantageously and intelligently select charging, discharging and idle modes for the various components of the device 100. For example, the battery management module 1902 can connect energy generating modules 104, 103 to the battery banks 1901 to charge the battery banks, or alternately, connect energy generating modules 104, 103 directly to the DC load 1903 or the main service panel 1906 through the DC-to-DC converter 1904 and the DC-to-AC converter 1907. The battery management module can connect fully charged battery banks 1901 to the DC load and/or the main service panel 1906. As described above, battery management module 1904 can charge the battery banks 1901 using AC power from the main service panel 1906 through line 1916 and stepdown AC-to-DC converter 1913.

Figure 20:
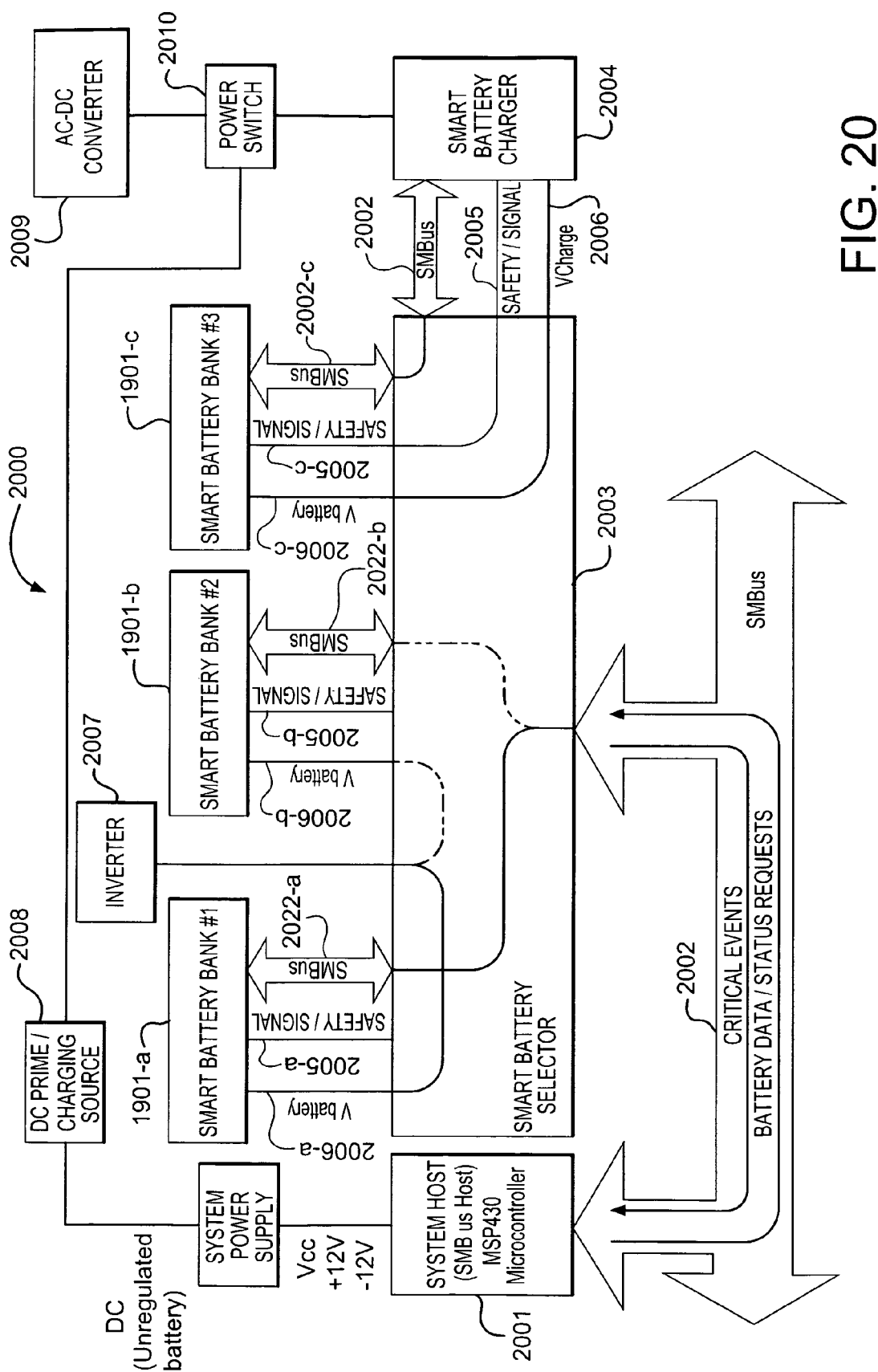
FIG. 20 is a functional block diagram of a smart battery charging system according to an exemplary embodiment of the present invention.

FIG. 20 illustrates another exemplary battery charging system having multiple independent battery banks, according to an embodiment of the present invention. As shown in FIG. 20, there are three smart battery banks 1901-a, 1901-b, and 1901-c. Each smart battery bank 1901-a, 1901-b, 1901-c is connected to a smart battery selector 2003 via a communication bus 2002, a safety/signal line 2005, and a charging/discharging conductor 2006. The smart battery selector 2003 comprises a set of switches to enable various connections between components of the smart battery system 2000 as will be described below. Any suitable switching device could be used, but in the illustrated embodiment the smart battery selector 2003 is advantageously addressable over System Management Bus (SMBus) protocol. The smart battery charging system 2000 includes a microcontroller system host 2001 which communicates with other components of the smart battery charging system 2000 using a communication protocol such as SMBus 2002. Over the SMBus, the system host 2001 can send battery data and status requests, and switching commands, and receive critical event alerts from each of the smart battery banks 1901-a, 1901-b, 1901-c, the smart battery selector 2003, and a smart battery charger 2004. The system host 2001 is programmed to intelligently switch the charging mode of each smart battery bank 1901-a, 1901-b, 1901-c between charging mode, discharging (supplying) mode, and idle mode. As illustrated, smart battery bank #1 1901-a is in discharging mode. The discharging conductor 2006-a is connected to inverter 2007 via smart battery selector 2003. Smart battery bank #2 1901-b is in idle mode. Conductor 2006-b is open circuited. Smart battery bank #3 1901-c is in charging mode. Charging conductor 2006-c is connected to the smart battery charger 2004. As needed, the system host 2001 transmits commands smart battery selector 2003 to cause the battery banks 1901-a, 1901-b, 1901-c to change among the three modes, as appropriate. The system host uses a novel routine to determine how and when to switch the smart battery banks among the three modes, as will be described below in connection with FIG. 21.

Figure 21:
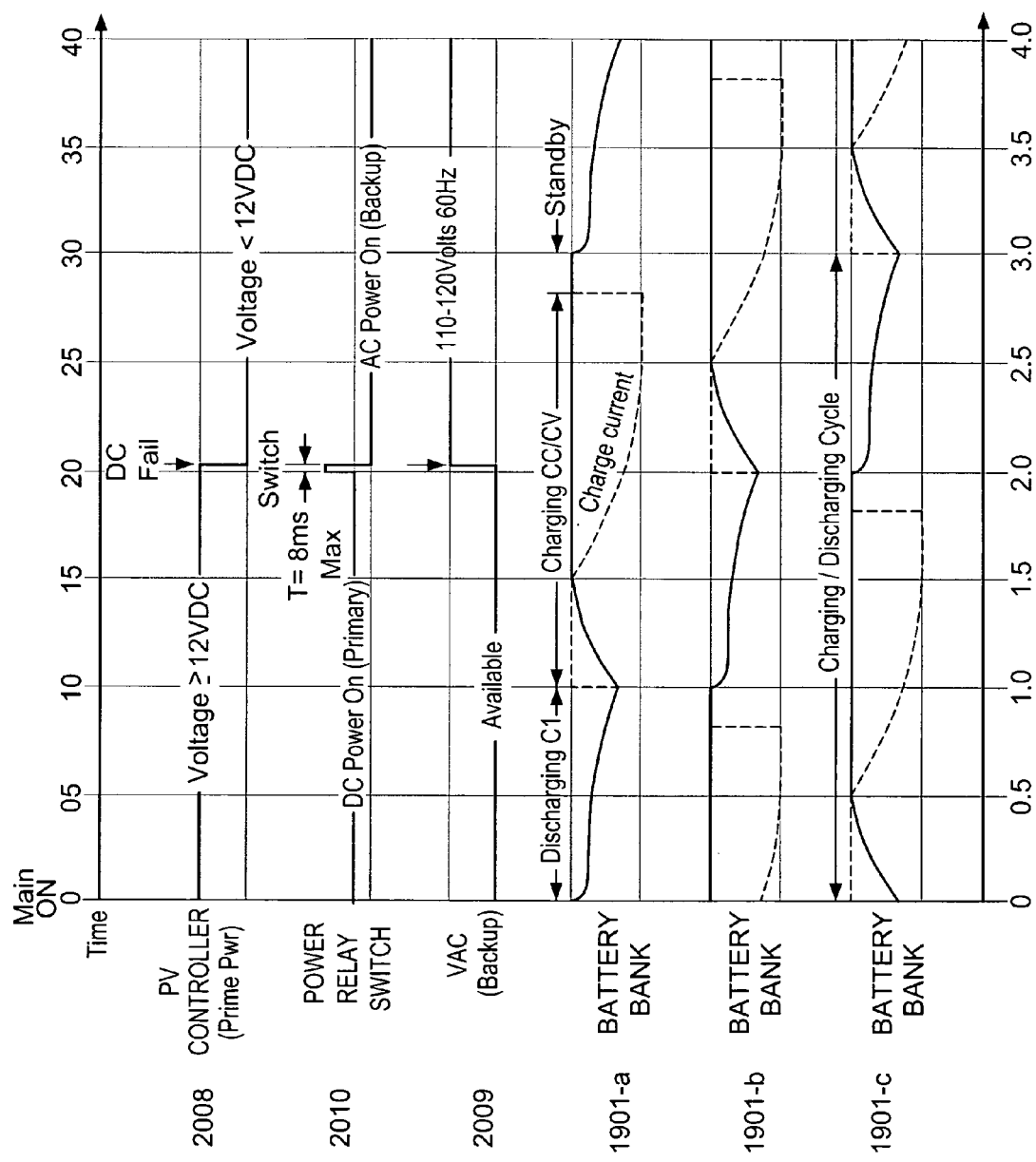
FIG. 21 is a timing diagram illustrating functions performed by the smart battery charging system of FIG. 20.

FIG. 21 is a timing diagram illustrating the charging/discharging/idle mode status of the three smart battery banks 1901-a, 1901-b, 1901-c, as set by the system host 2001 and the smart battery selector 2003. Initially, battery bank 1901-a is set to discharging mode. Accordingly, battery bank 1901-a is connected to inverter 2007 and supplies power to a load, as illustrated in FIG. 20. Battery banks 1901-b and 1901-c are initially set to charging mode. At roughly time period 0.8, battery bank 1901-b becomes fully charged and system host 2001 sends a command to smart battery selector 2003 via the SMBus to switch battery bank 1901-b to idle mode. Next, at time period 1.0 battery bank 1901-a reaches a threshold charge level. System host 2001 sends a command to smart battery selector 2003 to change battery bank 1901-a to charging mode, and to set battery bank 1901-b in discharge mode, such that battery bank 1901-b is connected to inverter 2007. Accordingly the power supply from the battery banks is not interrupted. At time period 1.8, battery bank 1901-c becomes fully charged and enters idle mode. At time period 2.0, battery bank 1901-b reaches the threshold charge level, and is set to charging mode. Concurrently, battery bank 1901-c is set to discharging mode, and is connected to inverter 2007. Again, the power supply from the battery banks 1901 is not interrupted. At time period 2.8, battery bank 1901-a becomes fully charged, and is set to idle mode. Finally, at time period 3.0, battery bank 1901-c reaches the threshold charge level, and is set to charging mode. Battery bank 1901-a is set to discharging mode and connected to the inverter 2007, and the routine continues.

Also illustrated in FIG. 21 is an automatic switchover from a DC charging source 2008 to an AC charging source 2009, when the DC charging source (the PV or thermionic energy generators) fails. At time period 2.0, the DC charging source 2008 fails. Power relay switch 2010 switches to the backup AC power supply. AC power is converted to DC and used to continue charging the smart battery banks 1901-a, 1901-b, 1901-c.

This "three card monty" style charging method is novel and advantageous for a number of reasons. First, applicant has found that maintaining the charge level of rechargeable batteries at or above a certain threshold, such as 80% of full charge increases the life span and charge capacity of rechargeable batteries. Second, one of the three battery banks 1901-a, 1901-b, 1901-c is always charged, so that continuous power is supplied. Third, by reducing the continuous charging time of each individual battery bank, the battery banks are heat up less, and the risk of fire is reduced.

As stated above, system host 2001 receives critical event alerts and responses to battery data/status requests. Accordingly, smart battery charging system 2000 can advantageously detect error conditions, such as overheating batteries, to stop charging or discharging processes and reduce or avoid the risk of fire, or detect damaged batteries caused by a voltage spike, or the like, and send an alert to the management/data acquisition unit 1912.

Figure 22A:
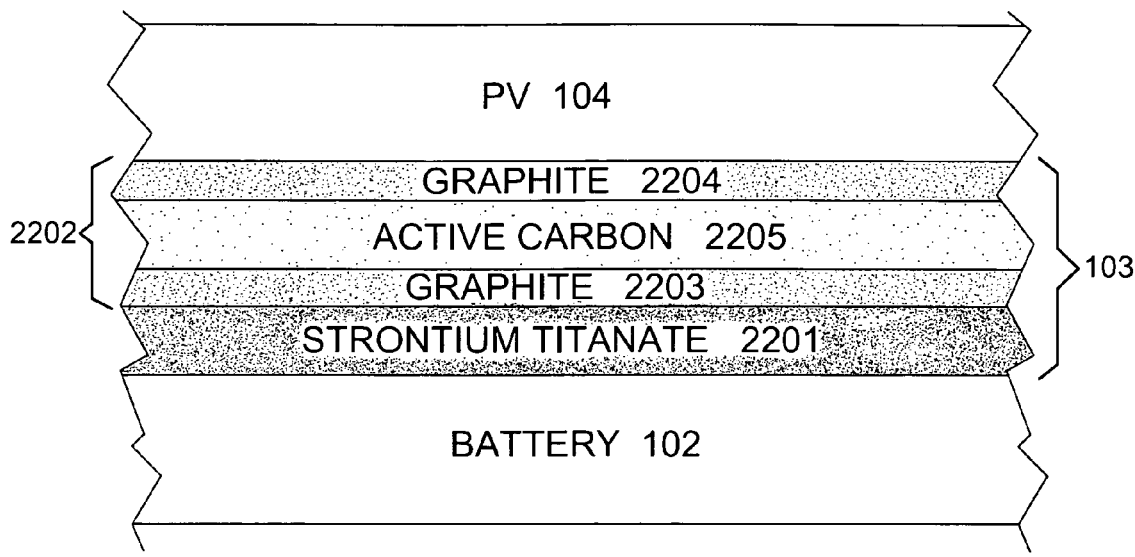
FIGS. 22A and 22B are cross sectional views of alternate embodiments of the present invention.
Figure 22B:
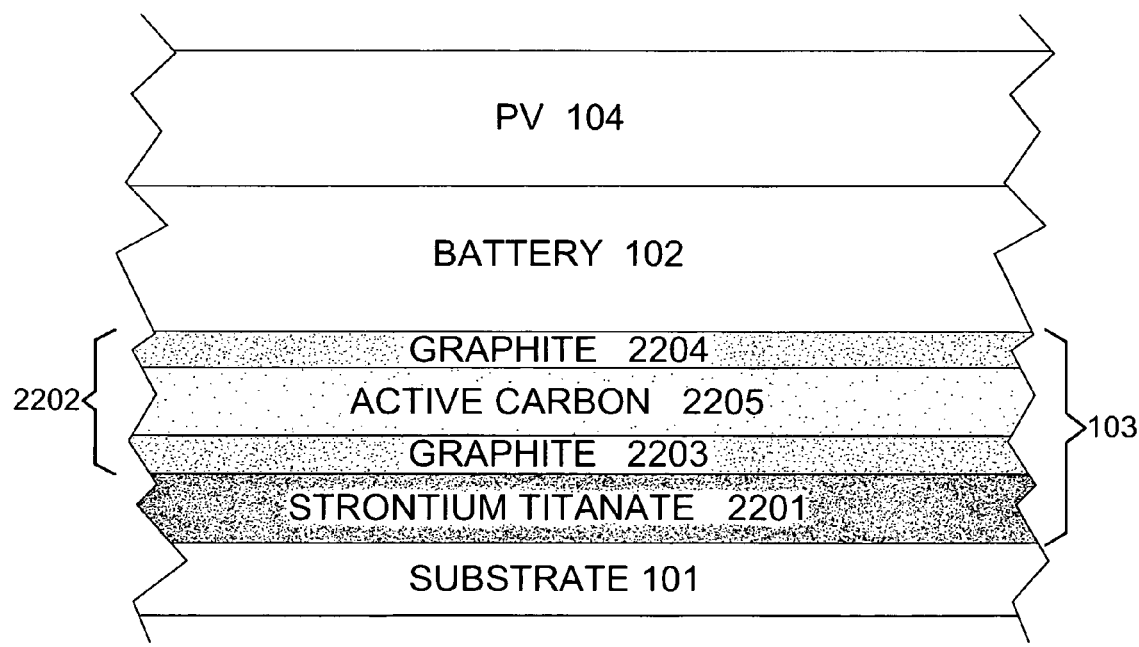

The thermionic layer 103 of FIG. 1 will now be described in further detail with reference to FIGS. 22A and 22B. Referring to FIG. 22A, the thermionic layer 103 comprises thermionic material 2201. As will be understood by those of ordinary skill in the art, thermionic materials collect ambient thermal energy and convert the collected thermal energy into electrical energy. Preferably, a parallel plate discharge capacitor 2202 is formed within the thermionic layer 103 in order to store electrical energy converted from ambient thermal energy. Advantageously, even small amounts of such converted energy can be stored in the parallel plate discharge capacitor and transferred to the battery layer 102 once a threshold charge is reached in the capacitor. Because the thermionic material forms part of the parallel plate capacitor, the accumulated charge is not dissipated by impedance losses caused by transferring the charge over a conductor to a remote storage unit or load. The parallel plate discharge capacitor 2202 accumulates the converted electrical energy over a period of time such that the total accumulated electric charge reaches a level suitable for transferring charges to the battery module 102 for more permanent storage. A control/switching mechanism is preferably included in the thermionic layer to control the level of the electric charges accumulated on the parallel discharge capacitor that may trigger the transferring of the electric charges to the battery module.

The parallel plate capacitor 2202 formed in the thermionic layer 103 comprises a positive electrode 2203, a negative electrode 2204 and a dielectric 2205. As discussed above in connection with FIG. 1, the thermionic layer 103 may be formed between the PV layer 104 and the battery layer 102, or alternately, inside the battery layer 102. In other words, the thermionic layer 103 may also be formed between the substrate 101 and the battery layer 102. FIG. 22A illustrates the thermionic layer 103 formed between the PV layer 104 and the battery layer 102. FIG. 22B illustrates the thermionic layer 103 formed between the battery 102 and the substrate 101.

In a preferred embodiment, the parallel plate discharge capacitor 2202 is formed of two deposited thin-film graphite layers around a dielectric layer that is preferably a thin-film deposited active carbon layer. One of the thin-film graphite layers is preferably deposited onto thermionic material 2201. A preferred thermionic material is strontium titanate, but those of ordinary skill in the art will recognize that any suitable thermionic material could be used. Charges generated by the thermionic layer 2201 accumulate on the adjacent thin-film graphite layer 2203, which is one of the electrodes of the parallel plate capacitor 2202.

Figure 23:
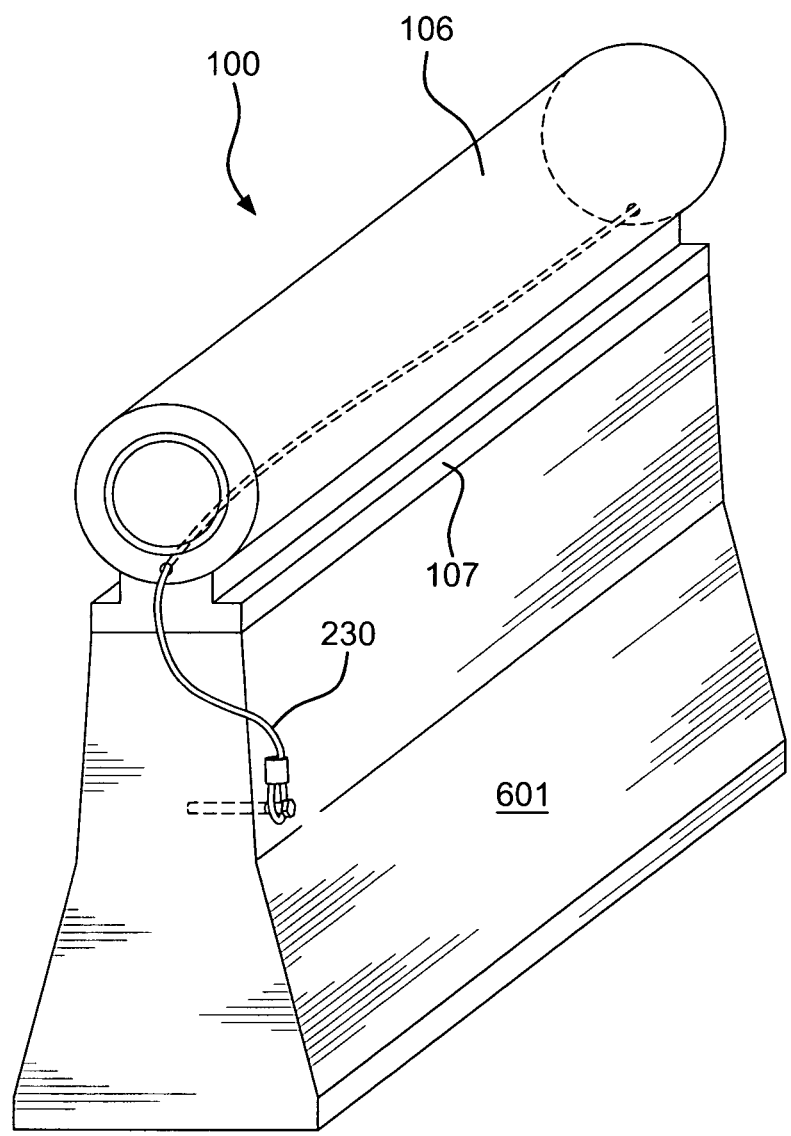
FIG. 23 illustrates a safety tether according to an exemplary embodiment of the present invention.

Referring back to FIG. 6, because devices 100 are installed on highway jersey walls, it is foreseeable that the devices may be struck by vehicles in vehicle accidents. As discussed above, the tube portion 106 of device 100 is preferably designed to breakaway from the base 107 upon a heavy impact, so that distribution conductors 501 remain safely embedded in the mounting clip 300. However, another safety concern in a vehicle accident is the breakaway tube portion 106 becoming a projectile. Accordingly, applicant has invented a novel safety feature designed to work with the device 100. FIG. 23 illustrates a safety tether 2301 incorporated into device 100. Safety tether 2301 is preferably a flexible steel cable that runs through the hollow tube portion of device 100. Safety tether 2301 is fastened to the infrastructure 601. Accordingly, if a vehicle strikes device 100 with enough force to cause the tube portion of device 100 to breakaway from the base 107, the safety tether 2301 will retain the tube portion 106 of the device 100 in close proximity to the infrastructure 601. Accordingly, the tube portion of device 100 advantageously does not become a dangerous projectile. Safety tether 2301 can be strung through an individual device 100, or alternately can be strung through any number of adjacent devices 100. Safety tether 2301 can be fastened to the infrastructure 601 at both ends, or alternately can be fastened to the infrastructure 601 at one end, and to the device 100 at the other end.

Figure 24:
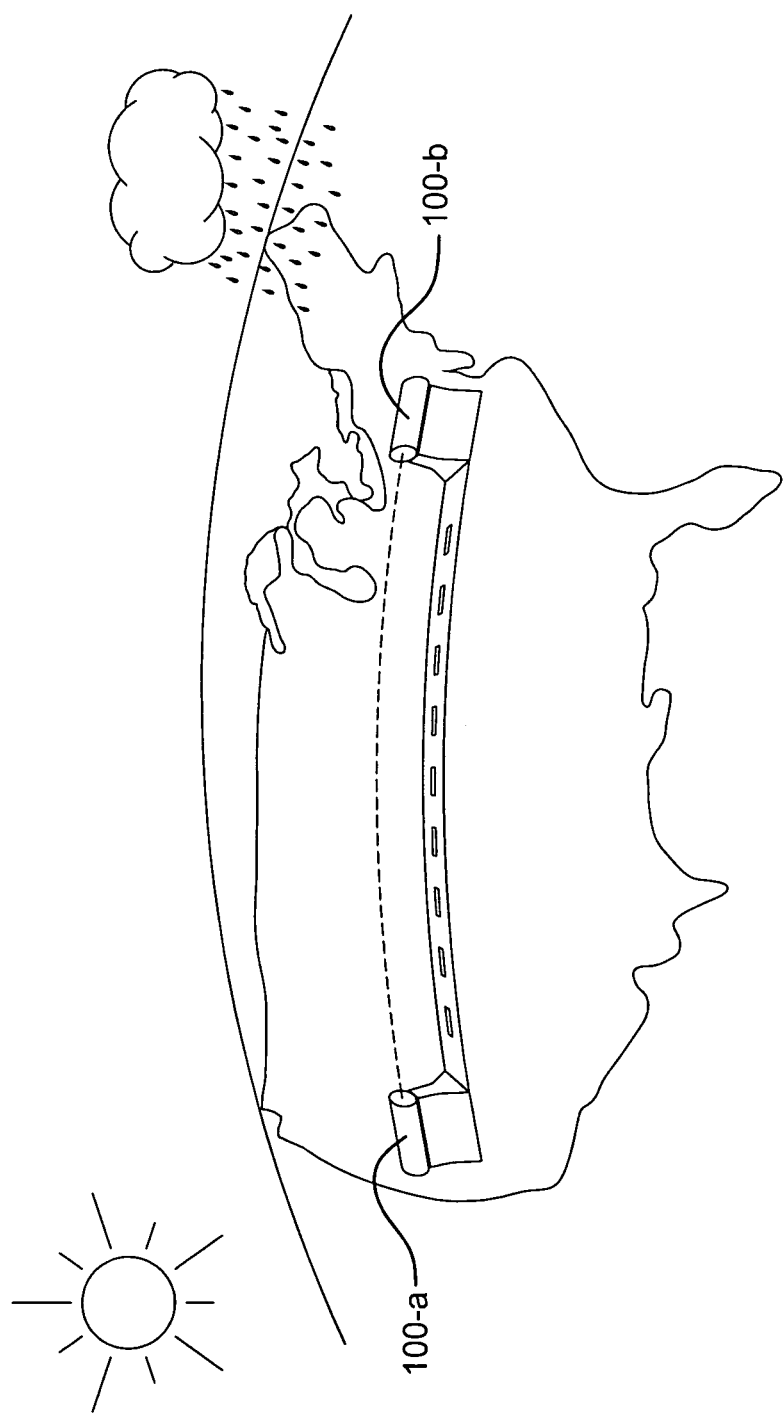
FIG. 24 illustrates a geographic advantage of a system according to an exemplary embodiment of the present invention.

A system according to an exemplary embodiment of the present invention will now be described in further detail in connection with FIG. 24. As shown in FIG. 24, a system of devices 100-a, 100b, can span large distances along existing highway infrastructure. The energy accumulated in one device 100 can easily be transferred to an adjacent device 100. Accordingly, through the system, known disadvantages of conventional solar energy systems are overcome. First, the geographic disparity of devices 100-a and 100-b increases the likelihood that sunshine is generating energy in one part of the system (100-a) even if inclement weather prevents significant energy generation in another part of the system (100-b). Similarly, the daily service time of the system is increased when one portion of the system (100-a) is in a different time zone than a second portion of the system (100-b). The modular energy storage 102 included in each device 100 allows the system to continue providing energy long after the sun has set on the entire system. Because storage 102 is advantageously included in each modular, autonomous device 100, the storage of the system naturally scales with the system. In addition, the curved nature of the devices 100 allows more sources of light to provide energy to the system. For example, indirect light received from any source, including car headlamps, overhead highway lighting, the stars, the moon, and so on, provide energy to the system. Heat from the highway activates the thermionic layer 103 of the devices 100. Accordingly, portions of the system in hot sunny climates such as the Arizona desert will have the advantage of generating energy from strong sunlight and immense heat generated by the blacktop highway. Furthermore, the PV layer 104 is preferably formed with materials such as amorphous silicon which are more efficient in converting photonic energy to electrical energy. Accordingly, the use of advanced materials in the device further enhances the efficiencies gained from the curved shape of the devices 100.

An assembled battery core 1500 portion of a device 100 according to an embodiment of the present invention can be made easily removable from the hollow tube portion of the device 100 (which includes the outer layer 105, the PV layer 104 and the thermionic layer 103). The assembled battery core 1500 can be used in a variety of applications, some of which will now be described.

Figure 25:
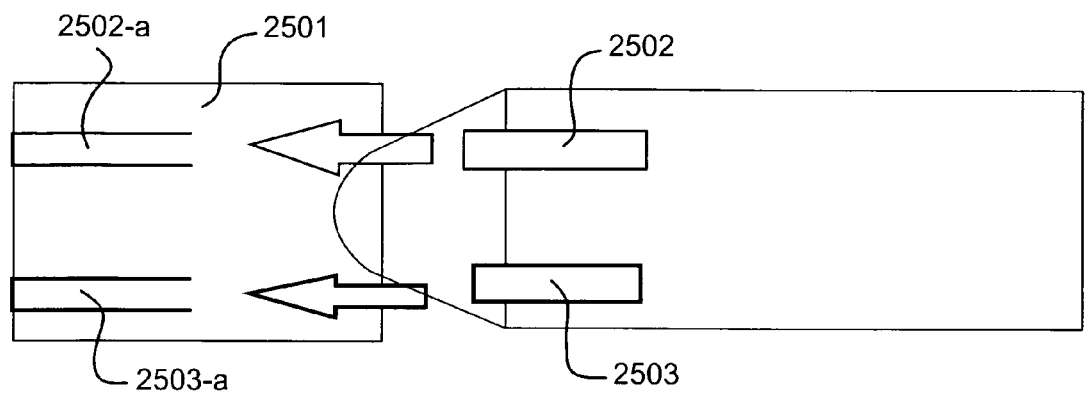
FIG. 25 illustrates a battery module according to an exemplary embodiment of the present invention.

As shown in FIG. 25, an assembled battery core 1500 is adapted to be received in a host device 2501. Battery core 1500 includes two electrodes 2502 and 2503. Host device 2501 includes electrodes 2502-a and 2503-a. Electrodes 2502 and 2503 are preferably slidably engageable with electrodes 2502-a and 2503-a when battery core 1500 is fully inserted into host device 2501.

Figure 26:
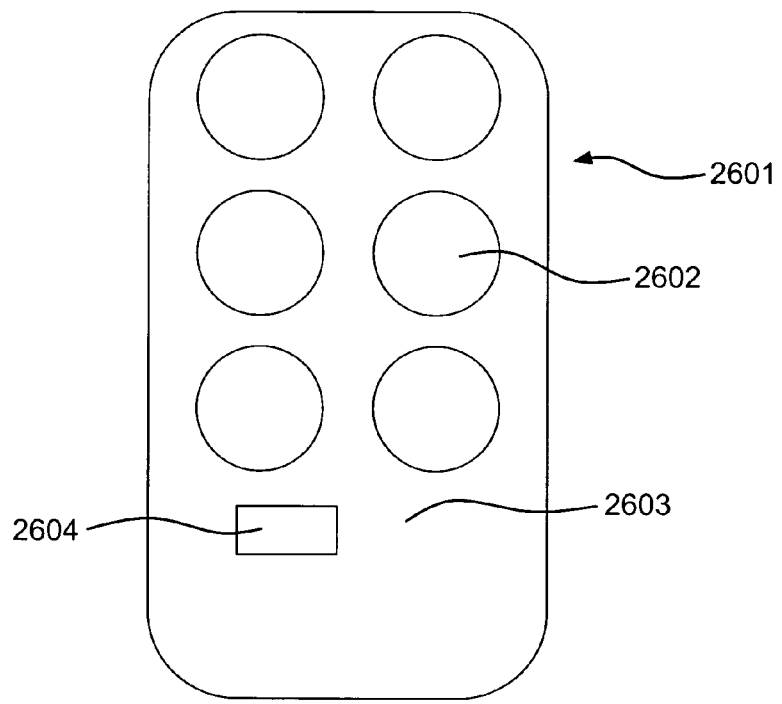
FIG. 26 illustrates a battery vending machine according to an exemplary embodiment of the present invention.

FIG. 26 illustrates and exemplary application of the battery core 1500 with a host device. Vending machine 2601 includes receiving ports 2602 that are each adapted to receive one or more battery cores 1500. The vending machine is preferably outfitted with a PV layer 2603 on the outer surfaces of the vending machine 2601, and optionally a thermionic layer inside the PV layer (not shown). The vending machine is also preferably outfitted with means to conduct a financial transaction 2604, such as a cash/coin slot or a credit card slot, or the like. The vending machine can optionally be connected to the power grid (such as being connected to AC power), or to a more extensive system of devices 100, including a system installed along infrastructure such as highway jersey walls or interior office cubicles, and the like. Customers insert depleted battery cores 1500 into empty receiving ports 2602, whereby the depleted battery core is recharged, preferably according to the method described above with reference to FIGS. 20 and 21. Fully charged battery cores 1500 are available for customers to obtain. Payment is made via the means to conduct a financial transaction 2604, and the vending machine releases a fully charged battery core 1500 for use by the customer.

Of course battery cores 1500 can also be charged in a first device and delivered to the vending machine for sale to customers. Accordingly, host charging stations can be located in any number of locations, including mounted on telephone poles, highway light poles, highway guard rails, and the like, to ensure a continuous supply of charged battery cores 1500 for vending machines.

A system of host charging stations and battery cores can also be made part of a community green energy system, such as on a college campus, or the like. In such a system, host charging stations are located around campus, and depleted battery cores are inserted into any host charging station. The host charging station preferably includes display means to display the charging status of the inserted battery core 1500. Members of the community green energy system, such as students, can remove charged battery cores 1500 from the host charging station. In this embodiment, the financial transaction means 2604 is optional.

Figure 27:
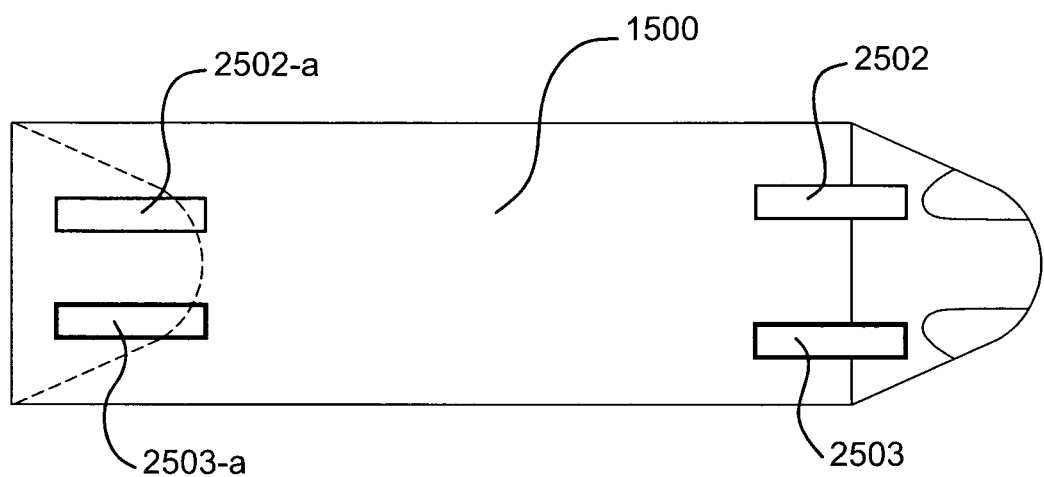
FIG. 27 illustrates a battery module according to another exemplary embodiment of the present invention.

FIG. 27 illustrates a battery core 1500 having electrodes 2502, 2503 for insertion into a host device at the proximal end of the battery core 1500, but also electrodes 2502-*a*, 2503-*a* at the distal end of the battery core, which are arranged to accept the proximal end electrodes 2502, 2503 of a subsequent battery core. In this manner, battery cores 1500 may be stacked together to increase power supply to a host device. FIG. 27 also illustrates that in a preferred embodiment, the battery core 1500 adapted for insertion into a host device 2501 includes a tapered proximal end, preferably of "bullet" or hemispherical shape. The distal end of battery core 1500 is also preferably shaped with a contour corresponding to the proximal end shape.

Figure 28A:
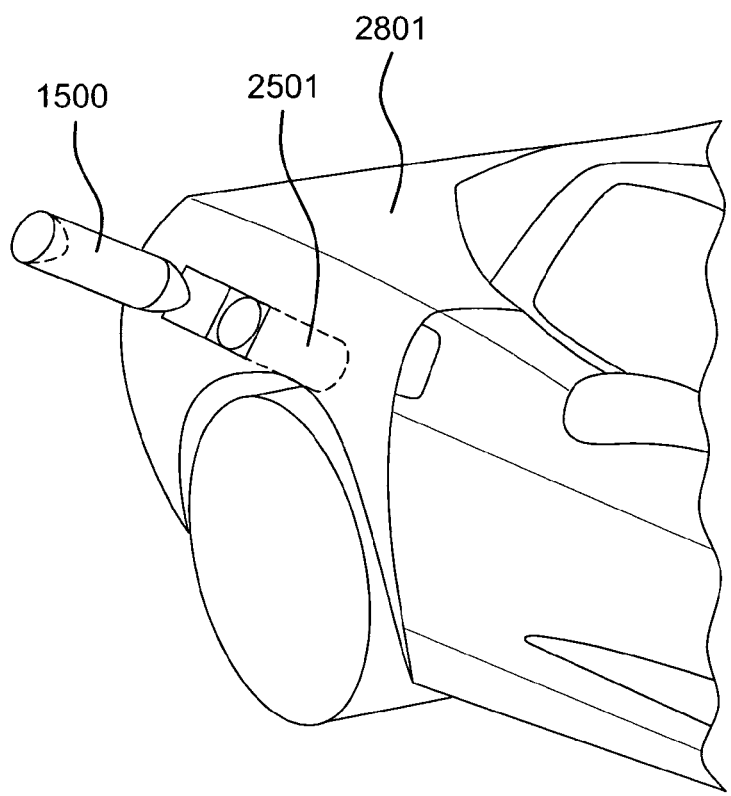
FIG. 28A is a perspective view illustrating a battery module inserted into an electric vehicle according to an exemplary embodiment of the present invention.
Figure 28C:
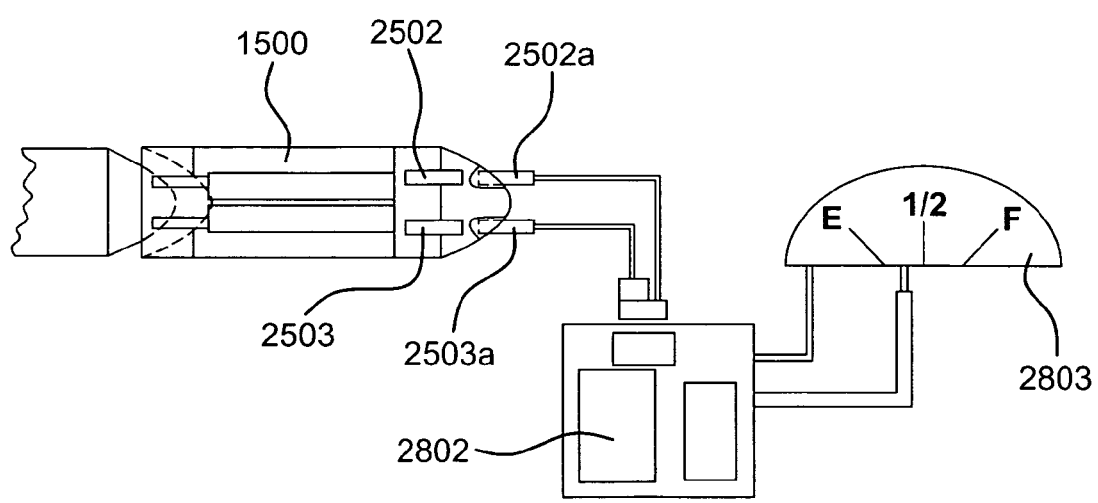
FIG. 28C illustrates a vehicle display according to an embodiment of the present invention.
Figure 28B:
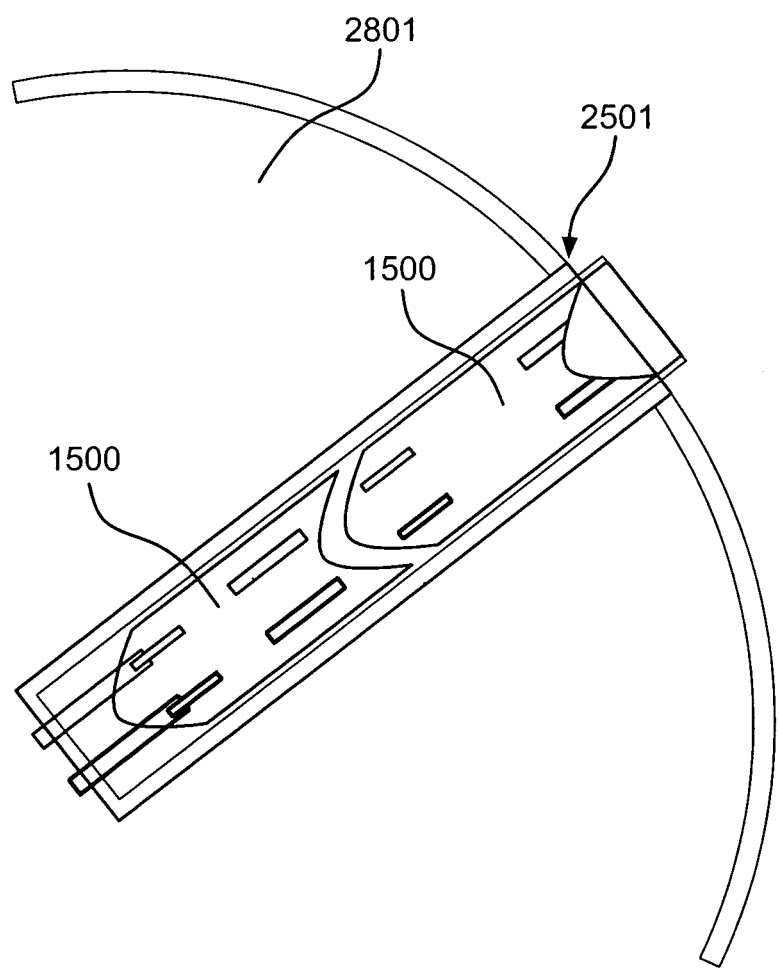
FIG. 28B is a cross-sectional view of the battery module and vehicle of FIG. 28A.

FIGS. 28A and 28B illustrates an electric vehicle 2801 that includes a receiving port 2501 that is adapted to receive one or more battery cores 1500. FIG. 28A is a perspective view of the vehicle 2801, showing the battery core 1500 and receiving port 2501. Receiving port 2501 can of course be located at any suitable location on the vehicle, but is shown arranged at the location of a typical fuel cap of a gas vehicle. FIG. 28B is a cross-sectional view illustrating a pair of battery cores 1500 inserted into the receiving port 2501 of the vehicle 2801 in piggy-back fashion for added capacity. In a preferred embodiment, the vehicle receiving port 2501 includes transport means (not shown) which smoothly ejects or receives battery cores 1500 from the receiving port 2501. The vehicle preferably includes a control mechanism in the vehicle cockpit that allows the driver to eject discharged battery cores 1500. When a charged battery core 1500 is inserted into the receiving port, the transport means preferably smoothly moves the charged battery core 1500 into the receiving port 2501 and into electrical contact with the electric vehicle 2801 or another battery core 1500.

As discussed above, the battery core 1500 preferably includes a microcontroller. 2001 and communication bus 2002. While inserted into an electric vehicle, battery core 1500 preferably provides updated battery charge information to a control computer 2802 of the vehicle via the communication bus. The control computer, in turn, calculates range information based on the battery charge information in combination with vehicle parameters, such as the vehicle's weight, engine horsepower, and the like. The calculated range is preferably displayed on a display 2803 located in the vehicle cockpit. The battery charge information can also optionally be displayed in the vehicle cockpit.

Figure 29:
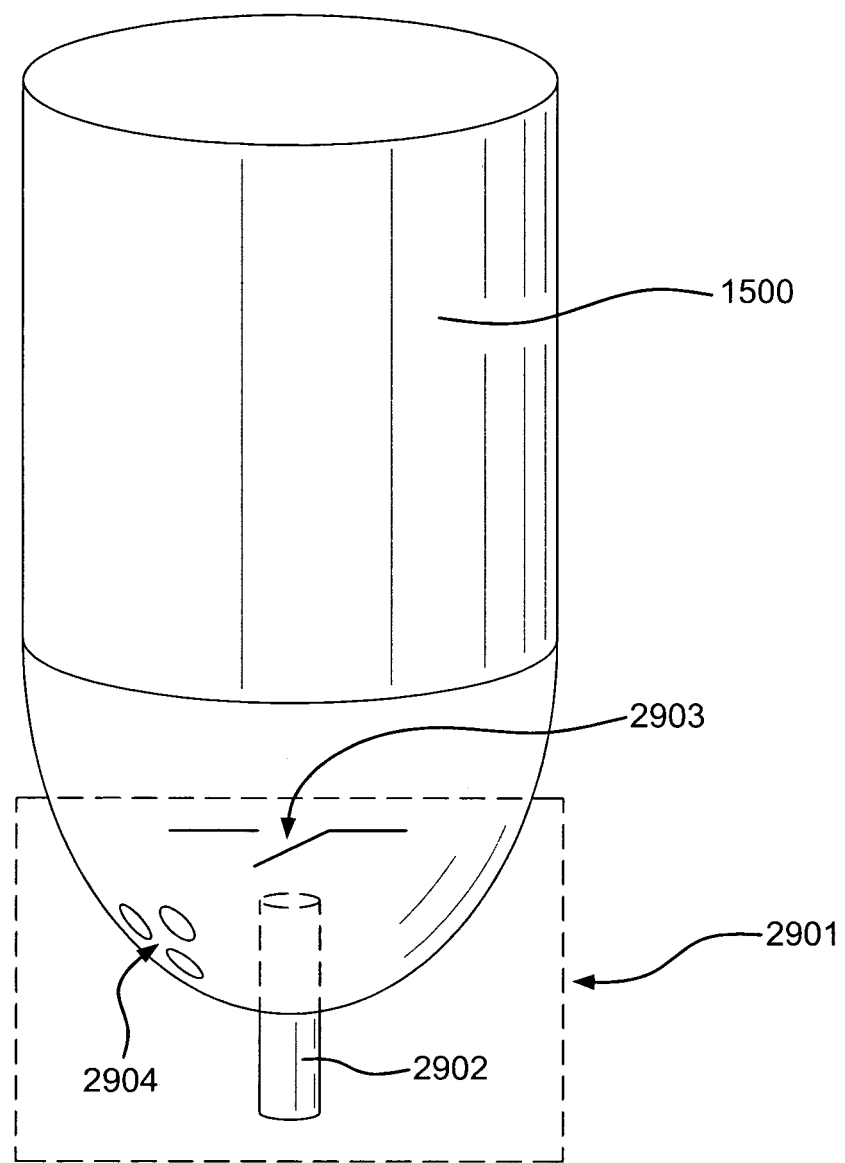
FIG. 29 illustrates a power lockout feature of a battery module according to an exemplary embodiment of the present invention.

FIG. 29 illustrates an embodiment of a battery core 1500 that includes a power lockout feature. The power lockout feature prevents power from being conducted to any external terminals until the battery core 1500 is fully engaged into a proper receiving port, in order to protect human beings from potentially hazardous electrical shock. As shown in FIG. 29, battery core 1500 includes power lockout 2901. Power lockout 2901 includes plunger 2902, electrical contact 2903, and keyed plunger release 2904. Preferably, plunger 2902 is elastically biased towards the distal end of the battery core 1500. When plunger 2902 is pressed proximally into the battery core, it closes electrical contact 2903, which causes the battery core to enable power to the external electrodes of the battery core 1500.

Plunger 2902 preferably is mechanically prevented from moving proximally until keyed plunger release 2904 is engaged. Keyed plunger release is illustrated as a pattern of three contacts, but any uniquely shaped arrangement of electrical contacts or mechanical buttons or the like could be used. When the battery core 1500 is inserted into a proper receiving port, a key portion (not shown) of the receiving port contacts the keyed plunger release 2904, thus enabling the plunger 2902 to move distally into the battery core. As the battery core 1500 is moved further into the receiving port, plunger 2902 causes electrical contact 2903 to short circuit, thus enabling the battery core 1500 to provide power to the external electrodes. Advantageously, if battery core 1500 is inserted into an improper receiving port, that does not include the corresponding key portion, then plunger 2902 will remain locked, and cannot move proximally to close electrical contact 2903. Hence, power is prevented from being delivered to the external electrodes of the battery core 1500. Naturally, the shape of keyed plunger release 2904 should advantageously be selected to be difficult or impossible to be activated by human hands, and to avoid naturally occurring shapes that may erroneously release the plunger 2902. Furthermore, keyed plunger release 2904 and the corresponding key portion may be uniquely arranged to tie a particular battery core to a particular electric vehicle, or the like. In this manner the power lockout 2901 can also serve as a theft deterrent.

Conventional electronic devices draw standard 120V or 240V AC power from a standard outlet. However, conventional electronic devices usually operate on DC as opposed to AC. Hence, to convert the standard 120VAC to the operating DC, a conventional device transforms AC power to DC power such as 12VDC. Such conversion process entails non-trivial energy losses.

On the other hand, conventional solar energy systems generate DC power and transform then DC power to AC power for distribution. Such conversion process creates further non-trivial energy losses.

As discussed above with reference to FIG. 7, systems according to embodiments of the present invention can provide both AC (converted from DC) power, and direct DC power. It would be advantageous to supply DC electronic devices with DC power directly from the a system of electricity generating devices 100 as illustrated in FIG. 7. Accordingly, applicant has invented a green switch outlet that works with compatible green switch devices to provide DC power through a standard AC outlet.

Figure 30:
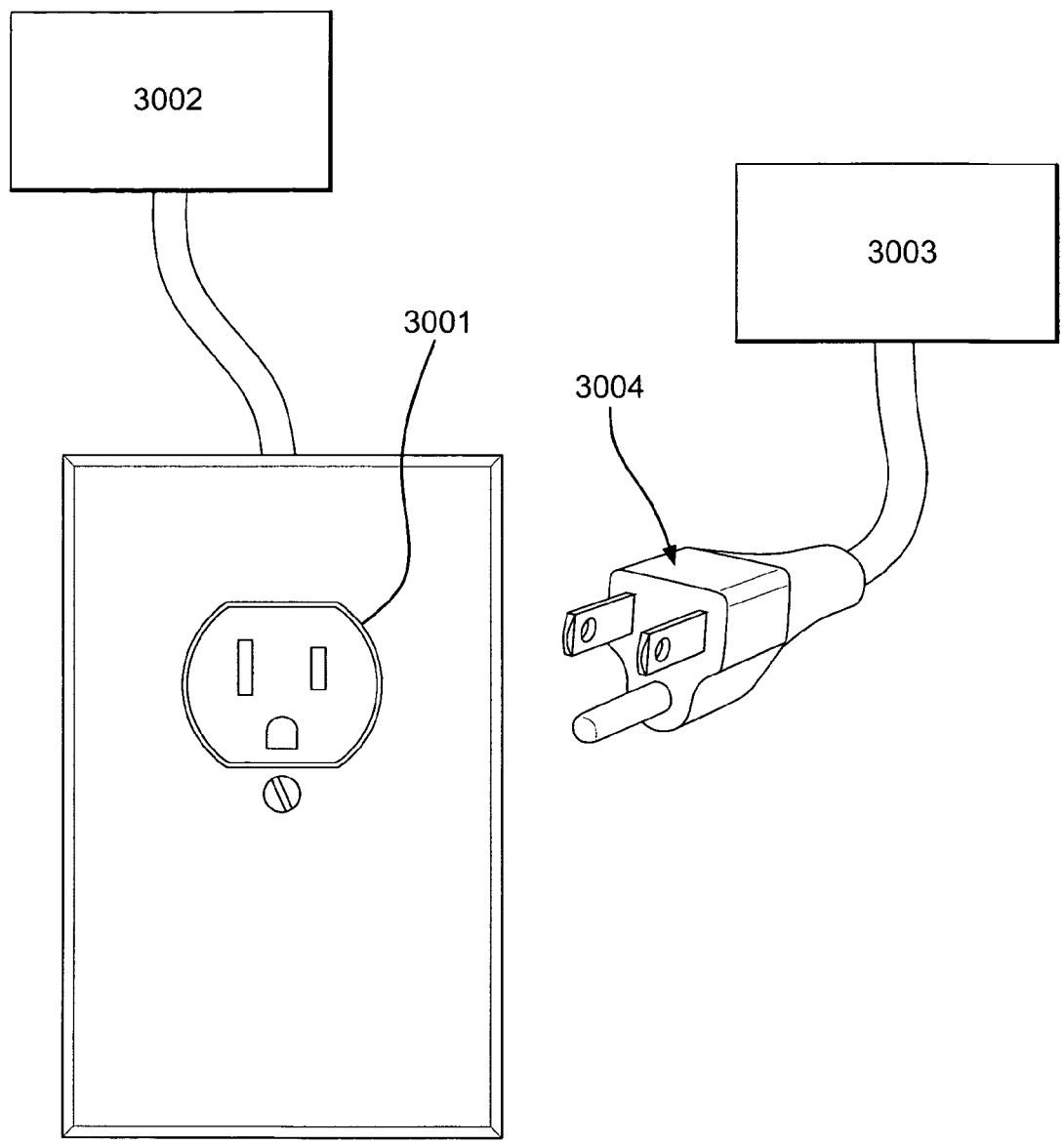
FIG. 30 illustrates a green switch outlet and green switch compatible device according to an exemplary embodiment of the present invention.

FIG. 30 illustrates a green switch outlet 3001 provided by a green switch system 3002 of energy generating devices 100. A green switch compatible device 3003 includes a standard shaped electrical plug 3004 that fits a standard AC outlet. Green switch compatible device 3003 preferably includes the standard power inverter to convert AC power to DC for use in the device 3003. Accordingly, if plug 3004 is inserted into a standard 120V AC outlet, device 3003 will function normally. However, when plug 3004 of green switch compatible device 3003 is inserted into a green switch outlet 3001, green switch system 3002 switches the power provided to the outlet 3001 to DC power, and green switch device 3003 bypasses its AC-to-DC transformer, and uses the DC power provided by the green switch outlet 3001 directly, thereby avoiding lossy conversions from DC-to-AC in the system 3002, and back from AC-to-DC in the device 3003.

Figure 31:
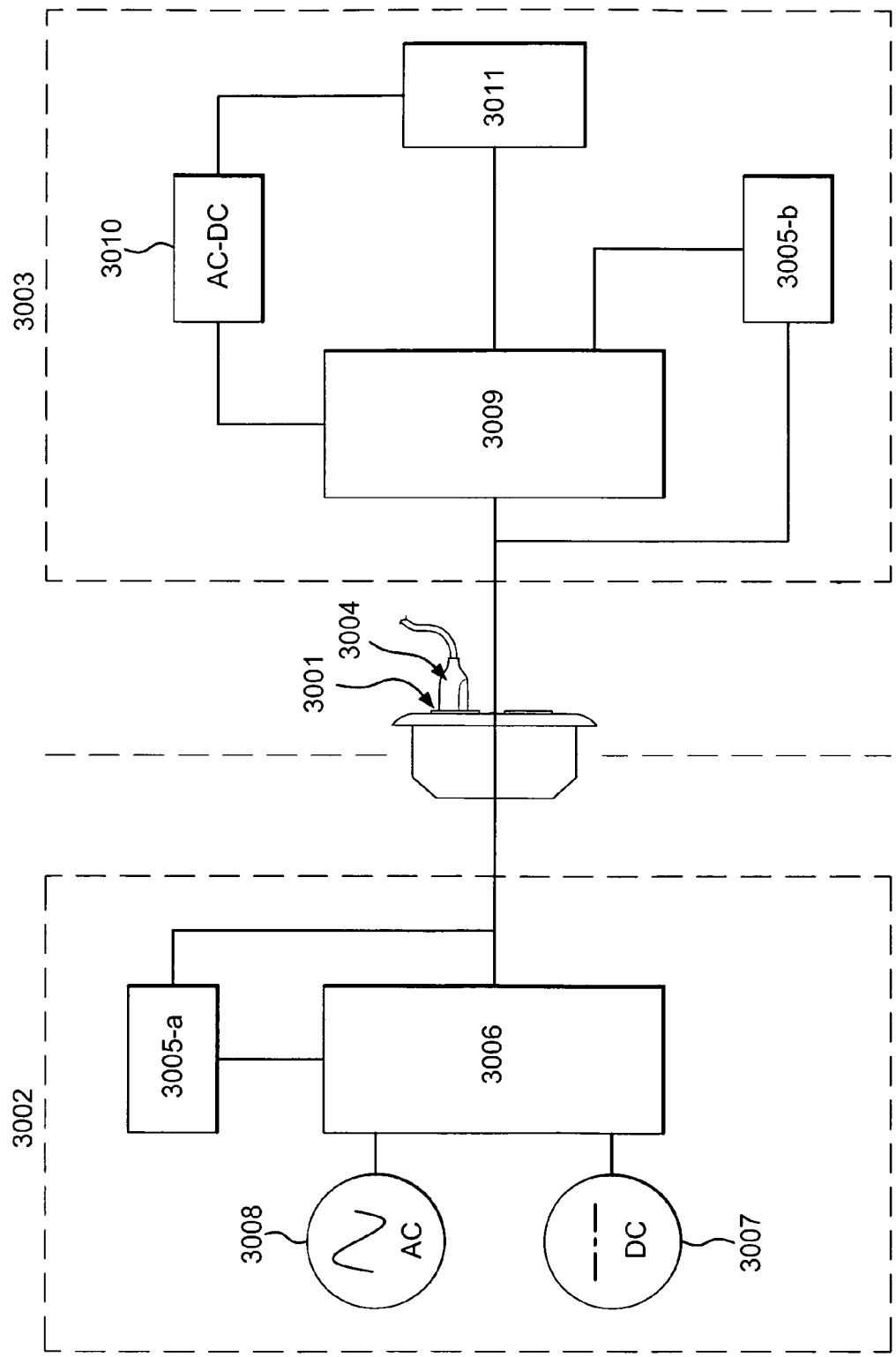
FIG. 31 is a functional block diagram of a green switch system and green switch compatible device according to an exemplary embodiment of the present invention.

FIG. 31 is a functional diagram of green switch system 3002, and green switch compatible device 3003. System 3002 and 3003 each include an out-of-band communication module 3005-*a*, 3005-*b*. System 3002 includes a power selector 3006 that is controlled by out-of-band communication module 3005-*a*. If out-of-band communication module 3005-*a* determines that a green switch compatible device 3003 is connected to green switch outlet 3001, then out-of-band communication module 3005-*a* sets power selector 3006 to connect the DC power supply 3007 of system 3002 to the green switch outlet 3001. However, if out-of-band communication module 3005-*a* is unable to determine that a green switch compatible device is connected to outlet 3001, then out-of-band selector 3005-*a* sets power selector 3006 to connect standard AC power 3008 to outlet 3001.

Green switch compatible device 3003 includes an out-of-band communication module 3005-*b* that attempts to communicate with out-of-band communication module 3005-*a* when plug 3004 is connected to outlet 3001. If out-of-band communication module 3005-*b* is unable to determine whether outlet 3001 is a green switch compatible outlet, then out-of-band communication module 3005-*b* sets power selector 3009 to connect plug 3004 to the AC-to-DC transformer 3010, which in turn supplies DC power to the power supply 3011 of device 3003. If, however, out-of-band communication module 3005-*b* is able to determine that plug 3004 is connected to a green switch compatible outlet 3001, then out-of-band communication module 3005-*b* sets power selector 3009 to connect plug 3004 directly to power supply 3011, advantageously bypassing AC-to-DC transformer 3010.

In this manner, out-of-band communication module 3005-*a* and out-of-band communication module 3005-*b* determine that a green switch compatible device 3003 is connected to green switch outlet 3001, and system 3002 advantageously supplies DC power to device 3003.

Of course, further enhancements to the above described system can be made, as will be readily appreciated by those of ordinary skill in the art. For example, device 3003 may communicate to system 3002 to set the particular DC voltage requested by device 3003. If capable, system 3002 can oblige. Device 3003 may require AC power at some times, and DC power at other times, such as a computer going into and out of sleep mode. Using the green switch technology described above, such a device could use AC for full power, and switch over to DC power when in sleep mode, then switch back to full AC power upon waking.

Once a series of devices 100 are installed along roads and highways, the devices 100 can advantageously serve as infrastructure for additional functions and services. In particular, the system of devices 100 advantageously include a hollow conduit, and have power available. Accordingly, traffic regulating devices, such as traffic cameras, speed detecting devices, signage, and vehicle immobilizing devices may be deployed along the system of devices 100. Distribution conductors 501 can serve as wired communication lines to, for example, transmit traffic camera data, speed detection data, and so on, to a centralized location, or alternately, to any internet device capable of addressing the system. Wireless internet service may also be provided by devices 100 such that passing vehicles have wireless access to the internet, using any known or emerging wireless communication protocol such as IEEE 802.11a/b/g/n.

A few presently contemplated alternative embodiments will now be described. First, a device 100 may be constructed to have a size and shape suitable for serving functions besides generating power. For example, a series of connected devices 100 each of a size and a shape similar to those of a rain gutter may be deployed as rain-gutters of residential or commercial buildings. As a result, those rain-gutter-devices 100 serve the dual purpose of collecting solar energy in sunlight and assisting with drainage during rain. Such a device may be constructed in a similar manner to the embodiment described with reference to FIG. 1, except that the PV layer 104 is formed on the inside of the tube, and the tube is split axially in half to form a convex gutter. A PV layer 104 may optionally be formed on both surfaces to capture light for a maximum duration of the day.

Figure 32:
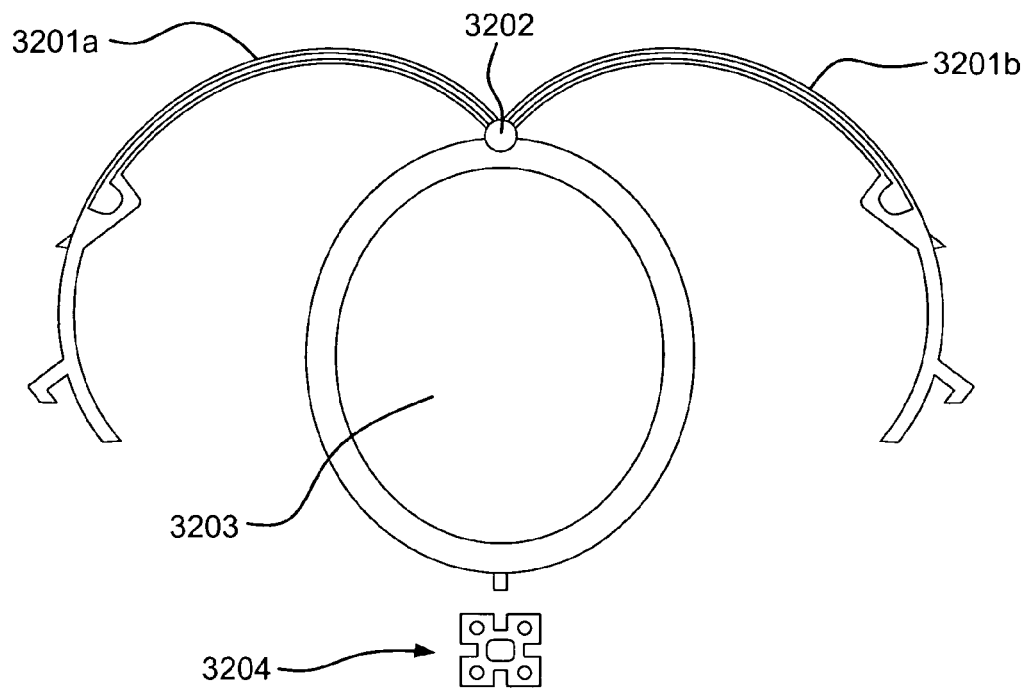
FIG. 32 illustrates a hinged embodiment of the present invention.
Figure 33:
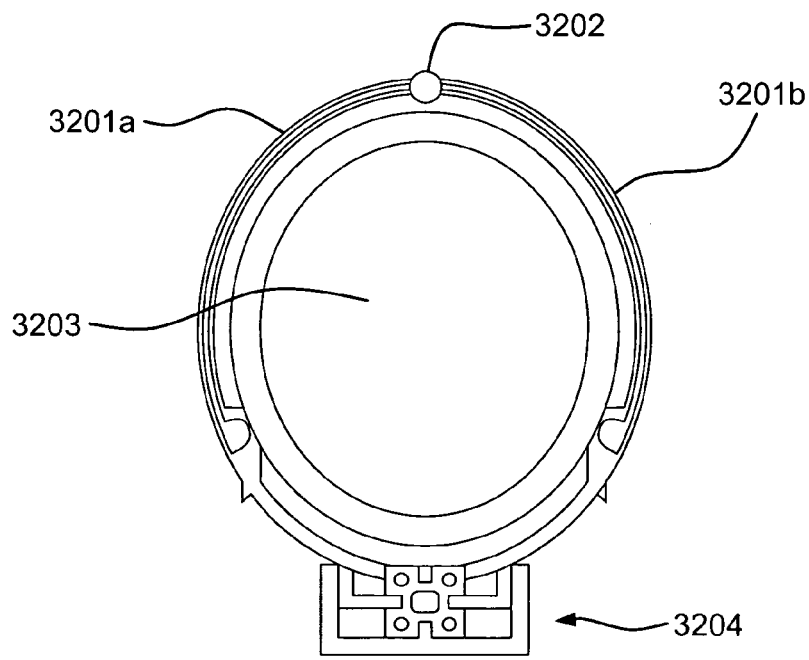
FIG. 33 is an alternate view of the hinged embodiment shown in FIG. 32.

As another example, a series of connected devices 100 each of a size and a shape similar to those of a hand-rail may be collectively deployed as hand-rails or as attachments to hand-rails. FIG. 32 illustrates an exemplary alternative embodiment of the present invention which is advantageous for attachment to handrails, light poles, and the like. As shown, the device includes two half-tubes 3201*a* and 3201*b* which are hinged at hinge 3202. The device can be wrapped around pole 3203 and connected to common infrastructure 3204 as shown in FIG. 33. As a result, much or all of the linear footage of handrails in a home or office, as well as vertical poles such as light poles, can serve the dual functions of power generator, and hand-rail or vertical pole. Of course, devices according to such embodiments may optionally be made to accommodate battery modules as described earlier.

Figure 34:
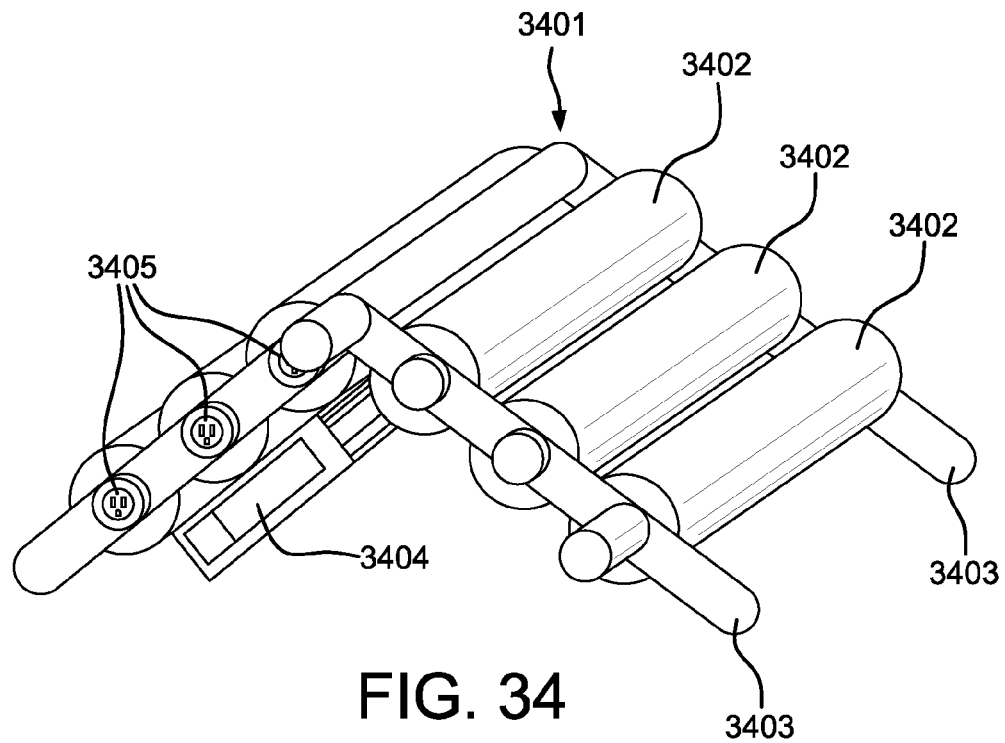
FIG. 34 illustrates a portable power generating device according to another exemplary embodiment of the present invention.
Figure 35:
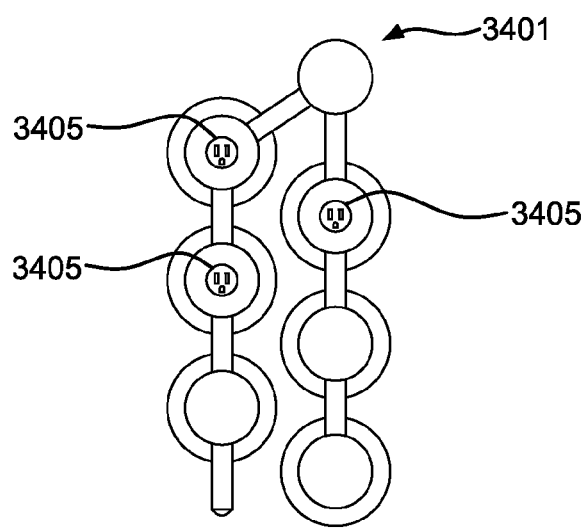
FIG. 35 is a side view of the portable power generating device shown in FIG. 34.
Figure 36:
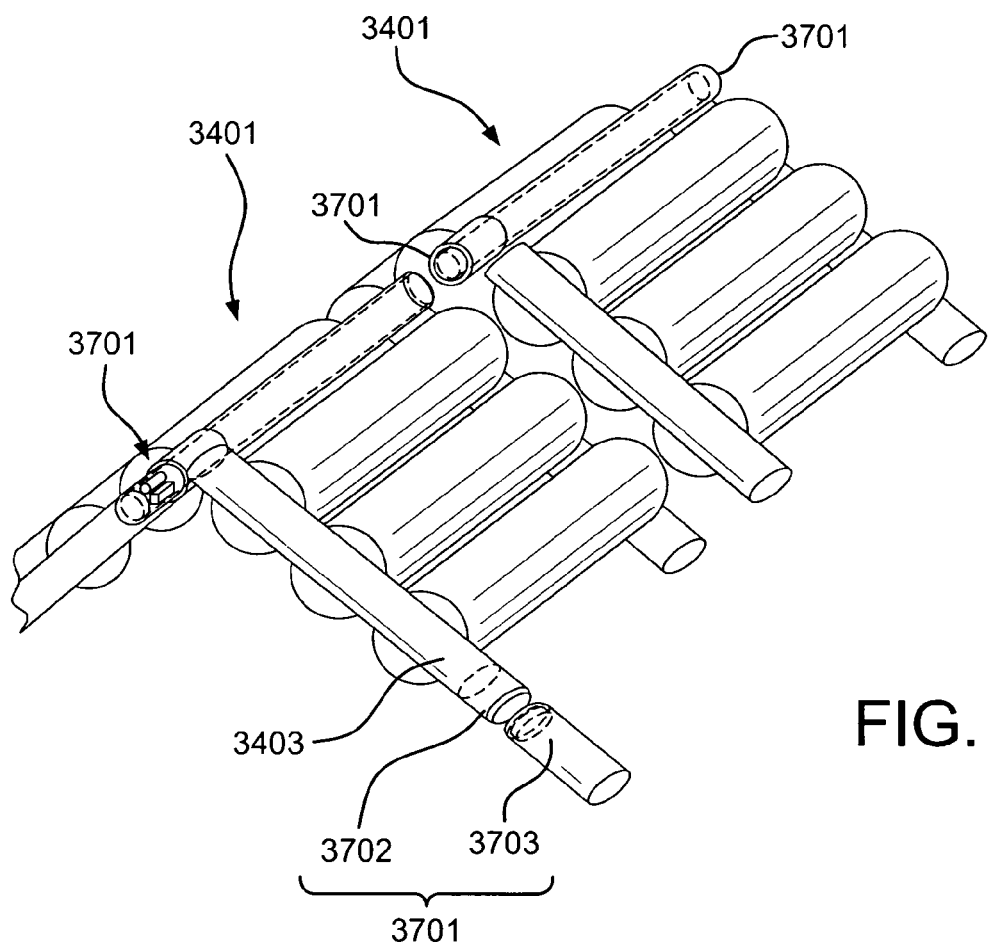
FIG. 36 illustrates multiple devices chained together.

As yet another example, embodiments of the present invention can be made portable. FIGS. 34 and 35 illustrate a portable generator 3401 according to an embodiment of the present invention. The portable generator 3401 includes multiple power generating tubes 3402 arranged on a frame 3403. An inverter and power transformer 3404 is provided to convert DC power to standard 120V AC (or any other suitable power profile). Power outlets 3405 are provided and allow 120V AC tools, and the like, to be powered from the portable generator. As shown in FIG. 36, multiple power generators 3401 may be connected together to increase the power generating capabilities. Preferably, standard connections 3701 are provided on each device 3401 such that the devices 3401 may be chained together both lengthwise and widthwise for an infinitely expandable portable power generating system. Connection 3701 preferably includes an inner locking ring 3702 that is substantially hollow in the middle, and is able to receive receiving tube 3703, and lock it in place.

Figure 37:
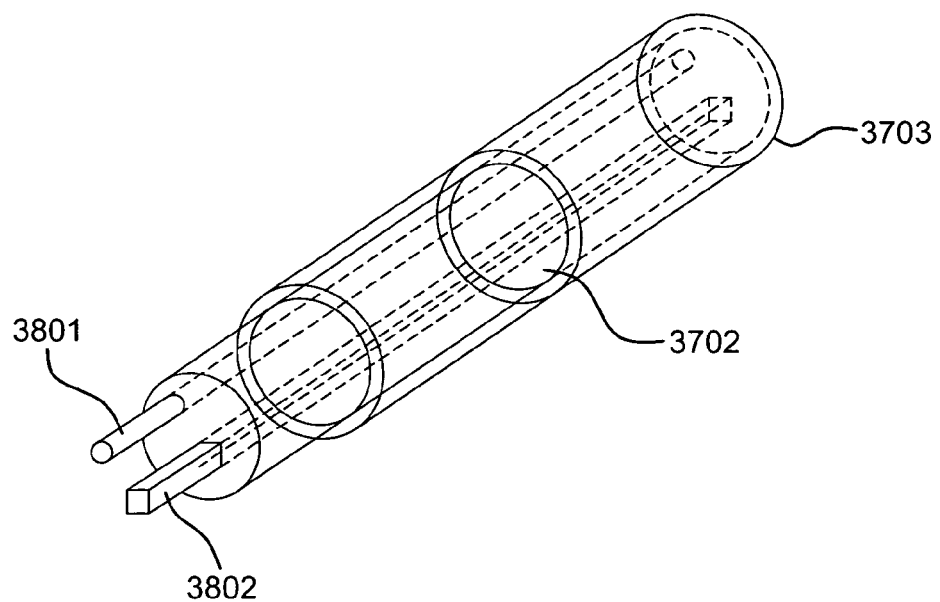
FIG. 37 illustrates a connection structure for chaining devices together as shown in FIG. 36.

FIG. 37 illustrates electrical conduction pathways in the hollow framing members of device 3401. Two conductors 3801, 3802 are formed to be received into complementarily shaped conductors of receiving tube 3703. The conductors 3801, 3802 are preferably of square and round cross section, preventing improper attachment of other devices.

In yet another portable configuration, a single, smaller tube can be formed with a single AC outlet, or alternately a green-switch as described above. Such device can be of a size that is convenient to store in a backpack or the like, and has power generating capabilities suited to charging or powering a laptop computer, cell phone, mp3 player, and the like. Such an embodiment is particularly suited for use by students.

Figure 38A:
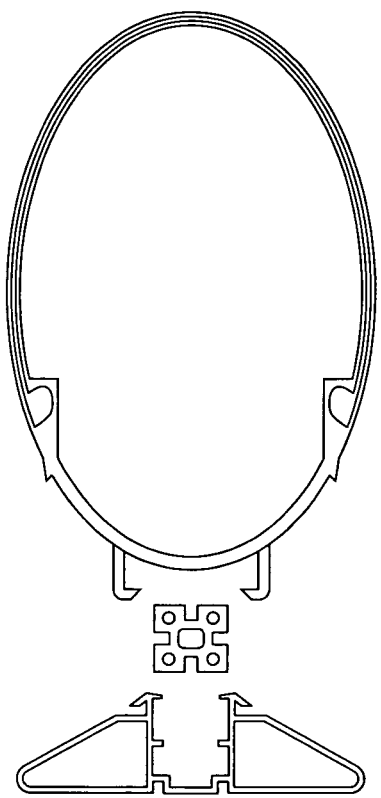
FIG. 38A illustrates an embodiment of the present invention with a vertically oriented oval cross-section.
Figure 38B:
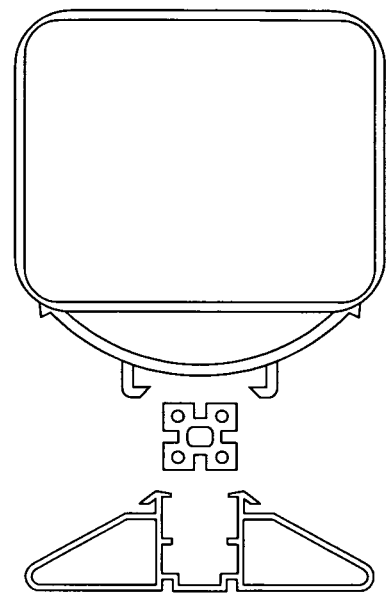
FIG. 38B illustrates an embodiment of the present invention with a square cross-section.
Figure 38C:
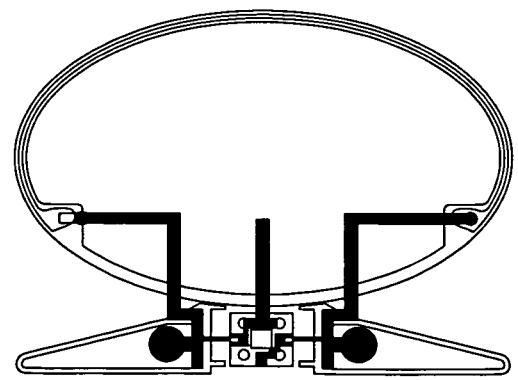
FIG. 38C illustrates an embodiment of the present invention with a horizontally oriented oval cross-section.

Applicants have determined that certain cross-sectional profiles other than circular, as described with reference to FIG. 1, are advantageous in particular applications. For example, FIG. 38A illustrates a vertically oriented oval cross-section shaped device. This shape has been found to be advantageous for use on highway jersey walls. The vertical orientation advantageously increases the incident surface area to capture light from vehicle headlights, and the like. FIG. 38B illustrates a square-shaped cross section with rounded corners. Applicants have found this shape to be advantageous for installation on the exterior of buildings with reflective windows. The square exterior housing of the device captures light reflected from the exterior building windows. Finally, at FIG. 38C, a horizontally oriented oval shape may also be used. Such a shape is advantageous for application on the top of highway sound barrier walls. The elliptical shape, when coated with a Teflon material, such as PFTE, defeats overgrowing vegetation, thereby reducing or eliminating the need to manually remove vegetation from the power generating device.

What is claimed is:

1. A portable power generating device comprising
a plurality of tube-shaped energy generating modules arranged on a hinged frame in a linear array, each tube-shaped energy generating module comprising a clear outer protective layer, an outwardly facing PV layer disposed inside the clear outer protective layer for receiving photonic energy transmitted from the outside environment, and a thermionic layer disposed inside the clear outer protective layer, each said tube-shaped energy generating module further comprising a first module end and a second module end opposite said first module end and defining a longitudinal axis extending from said first module end to said second module end, said device further comprising an inverter and at least one plug receptacle connected to the inverter to provide AC power to the plug receptacle;
wherein the hinged frame comprises a hinge, a first pair of legs upon which a first plurality of said tube-shaped energy generating modules are arranged such that said first module end of each of said first plurality of modules is mounted to a first one of said first pair of legs and said second module end of each of said first plurality of modules is mounted to a second one of said first pair of legs, and a second pair of legs upon which a second plurality of said tube-shaped energy generating modules are arranged such that said first module end of each of said second plurality of modules is mounted to one of said second pair of legs and said second module end of each of said second plurality of modules is mounted to a second one of said second pair of legs, the first pair of legs being rotatable about said hinge from a compact configuration in which said first and second pairs of legs are substantially parallel to one another and distal ends of said first and second pairs of legs are displaced from one another by a first distance, to an expanded configuration in which distal ends of said first and second pairs of legs are displaced by a second distance greater than said first distance, and wherein when in said expanded configuration, said first pair of legs forms an angle less than 180 degrees with said second pair of legs;
wherein each of said first plurality of modules are positioned with respect to one another to define an open, unobstructed space between adjacent modules, each said open space between said first plurality of modules having a length dimension extending from the first one of said first pair of legs to the second one of said first pair of legs, and having a width dimension extending from an exterior of one of said first plurality of modules to a second, adjacent one of said first plurality of modules;
wherein each of said second plurality of modules are positioned with respect to one another to define an open, unobstructed space between adjacent modules, each said open space between said second plurality of modules having a length dimension extending from the first one of said second pair of legs to the second one of said second pair of legs, and having a width dimension extending from an exterior of one of said second plurality of modules to a second, adjacent one of said second plurality of modules; and
wherein each said open space is configured to allow airflow between said adjacent modules in a direction perpendicular to said longitudinal axes and from a first, exterior side of said frame to a second, opposite, interior side of said frame.

2. The portable power generating device of claim 1, further comprising a connection apparatus for connecting said device to another said device.

3. The portable power generating device of claim 1, wherein the outwardly facing PV layer comprises an outwardly facing surface and an inwardly facing surface, and the outwardly facing surface is adapted to receive photonic energy from the outside environment and convert the received photonic energy into electrical energy.

4. The portable power generating device of claim 1, further comprising a male electrical connector disposed along a first end of said hinged frame, and a complementarily shaped female connector disposed along a second end of said hinged frame, the male and female connectors adapted to be connected to respective female and male connectors of subsequent portable power generating devices in order to accumulate power generating capability.

5. The portable power generating device of claim 4, wherein the male connector comprises a first electrical conductor having a square cross section and a second electrical conductor having a round cross section.

6. The portable power generating device of claim 4, wherein respective male and female connectors of subsequent devices are adapted to lock to one another.

* * * * *